(12) United States Patent
Nicolae et al.

(10) Patent No.: US 11,567,756 B2
(45) Date of Patent: Jan. 31, 2023

(54) CAUSALITY DETERMINATION OF UPGRADE REGRESSIONS VIA COMPARISONS OF TELEMETRY DATA

(71) Applicant: MICROSOFT TECHNOLOGY LICENSING, LLC, Redmond, WA (US)

(72) Inventors: Andrei Nicolae, Redmond, WA (US); Rahul Nigam, Bothell, WA (US); Parminder Pal Singh, Redmond, WA (US); Mark R. Gilbert, Issaquah, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 16/820,631

(22) Filed: Mar. 16, 2020

(65) Prior Publication Data

US 2021/0286614 A1 Sep. 16, 2021

(51) Int. Cl.
*G06F 9/44* (2018.01)
*G06F 8/658* (2018.01)
(Continued)

(52) U.S. Cl.
CPC .......... *G06F 8/658* (2018.02); *G06F 11/1433* (2013.01); *H04L 67/10* (2013.01); *H04L 67/34* (2013.01); *G06F 2201/865* (2013.01)

(58) Field of Classification Search
CPC ....................................................... G06F 8/658
(Continued)

(56) References Cited

U.S. PATENT DOCUMENTS 8,219,983 B1 7/2012 Sobel et al.
8,635,272 B2* 1/2014 Reisman .............. G06Q 10/025
709/215

(Continued)

OTHER PUBLICATIONS

"International Search Report and Written Opinion Issued in PCT Application No. PCT/US21/014474", dated Apr. 30, 2021, 13 Pages.

(Continued)

*Primary Examiner* — Evral E Bodden
(74) *Attorney, Agent, or Firm* — Newport IP, LLC; Jacob P. Rohwer

(57) ABSTRACT

Disclosed herein is a system for automating the causality detection process when upgrades are deployed to different resources that provide a service. The resources can include physical and/or virtual resources (e.g., processing, storage, and/or networking resources) that are divided into different, geographically dispersed, resource units. To determine whether a root cause of a problem is associated with an upgrade event that has recently been deployed, a system is configured to use telemetry data to compute an upgrade-to-upgrade score that represents differences between two different upgrade events that are deployed to the same resource unit. The system is further configured to use telemetry data to compute an upgrade unit-to-unit score that represents differences between the same upgrade event being deployed to two different resource units. The scores can be used to output an alert, for an analyst, that signals whether a recently deployed upgrade event is the cause of a problem.

20 Claims, 11 Drawing Sheets

(51) Int. Cl.
*G06F 11/14* (2006.01)
*H04L 67/10* (2022.01)
*H04L 67/00* (2022.01)

(58) Field of Classification Search
USPC ........................................................ 717/172
See application file for complete search history.

(56) References Cited

U.S. PATENT DOCUMENTS

| | | | |
|---|---|---|---|
| 9,665,359 | B2 | 5/2017 | Thomas et al. |
| 9,734,093 | B2* | 8/2017 | Khemani .................. H04L 9/32 |
| 9,952,850 | B2 | 4/2018 | Joshi et al. |
| 10,089,099 | B2 | 10/2018 | Chang et al. |
| 10,114,636 | B2 | 10/2018 | Lehner et al. |
| 10,116,670 | B2* | 10/2018 | Muddu .................. G06N 20/20 |
| 10,244,081 | B2* | 3/2019 | Ananthanarayanan ...................... H04L 67/42 |
| 10,338,913 | B2* | 7/2019 | Franchitti .............. G06N 5/022 |
| 10,416,982 | B1 | 9/2019 | Langley et al. |
| 10,963,195 | B1* | 3/2021 | Zakharov .............. G06F 3/1229 |
| 11,032,395 | B2* | 6/2021 | Correia e Costa ... H04L 67/025 |
| 2003/0233648 | A1* | 12/2003 | Earl .......................... G06F 8/65 717/176 |
| 2015/0178066 | A1 | 6/2015 | Horn et al. |
| 2017/0308375 | A1 | 10/2017 | Lehner et al. |
| 2018/0131574 | A1 | 5/2018 | Jacobs et al. |
| 2018/0300180 | A1 | 10/2018 | Shepard et al. |
| 2019/0097907 | A1 | 3/2019 | Nickolov et al. |
| 2019/0266502 | A1 | 8/2019 | Moser et al. |
| 2019/0303132 | A1 | 10/2019 | Krishnaswamy et al. |
| 2019/0356553 | A1 | 11/2019 | Mermoud et al. |

OTHER PUBLICATIONS

"HPE InfoSight—Artificial Intelligence for Autonomous Infrastructure", Retrieved From: https://h20195.www2.hpe.com/v2/getpdf.aspx/a00043401enw, Oct. 2019, 6 Pages.

Platon, et al., "Introduction to Service Fabric Health Monitoring", Retrieved From: https://docs.microsoft.com/en-us/azure/service-fabric/service-fabric-health-introduction, Feb. 28, 2018, 15 Pages.

\* cited by examiner

ANALYST GUI 300

| ALERT(S) | RESOURCE(S) | DETECTION TIME |
|---|---|---|
| DEFECTIVE CODE IN UPGRADE 123 | UNITS 1 THROUGH 10 ARE AFFECTED (ALL UPGRADED UNITS) | FEB. 20 @ 4:30PM |
| | UNITS 11 THROUGH 45 ARE NOT AFFECTED (ALL NON-UPGRADED UNITS) | |

STOP DEPLOYMENT
302

FIG. 3A

Analyst GUI 304

| Alert(s) | Resource(s) | Detection Time |
|---|---|---|
| Anomaly in Metric for Upgraded Unit 8 | Upgraded Units 1-7, 9, and 10 are not affected | Feb. 20 @ 4:30PM |

View Metric(s) for Unit 8
306

```
┌─────────────────────────────────────────────────────────────┐
│ RECEIVE TELEMETRY DATA FROM EACH OF A PLURALITY OF UNITS    │
│           CONFIGURED WITH RESOURCES TO PROVIDE A SERVICE    │
│                           402                                │
└─────────────────────────────────────────────────────────────┘
                              ↓
┌─────────────────────────────────────────────────────────────┐
│ DETECT AN ANOMALY ASSOCIATED WITH A CURRENT UPGRADE EVENT    │
│                  BEING DEPLOYED TO A UNIT                    │
│                           404                                │
└─────────────────────────────────────────────────────────────┘
                              ↓
┌─────────────────────────────────────────────────────────────┐
│ COMPUTE, USING THE TELEMETRY DATA FOR THE UNIT, A SCORE      │
│ THAT REPRESENTS A DIFFERENCE BETWEEN (I) VALUES ASSOCIATED   │
│ WITH A PREVIOUS UPGRADE EVENT DEPLOYED TO THE UNIT AND (II)  │
│ VALUES ASSOCIATED WITH A CURRENT UPGRADE EVENT DEPLOYED      │
│                       TO THE UNIT 406                        │
└─────────────────────────────────────────────────────────────┘
                              ↓
                    ╱ SCORE EXCEED A  ╲
          No       ╱  DIFFERENCE        ╲      YES
     ←───────────  ╲  THRESHOLD?         ╱  ───────────→
                    ╲    408            ╱

┌──────────────────┐                    ┌──────────────────┐
│ SUPPRESS AN ALERT│                    │    IMPLEMENT     │
│  THAT SIGNALS A  │                    │ COMPARISON TO    │
│   PROBLEM 410    │                    │ OTHER UPGRADED   │
│                  │                    │    UNIT(S) 412   │
└──────────────────┘                    └──────────────────┘
```

FIG. 4

CAUSALITY DETERMINATION OF UPGRADE REGRESSIONS VIA COMPARISONS OF TELEMETRY DATA

BACKGROUND

Providing an optimal user experience is an important aspect for cloud-based platforms that offer network services. As cloud computing gains popularity, more and more data and/or services are stored and/or provided online via network connections. In many scenarios, a cloud-based platform may provide a service to thousands or millions of users (e.g., customers, clients, etc.) geographically dispersed around a country, or even the world. In order to provide this service, a cloud-based platform often includes different resources, such as server farms, hosted in various datacenters.

In order to continue to improve the user experience and/or provide an optimal user experience, an entity providing the service may deploy upgrades to the different resources. The upgrades may include updated code and/or other mechanisms configured to maintain, correct, add, and/or remove functionality associated with the service provided. In many instances, upgrades may be deployed in accordance with a predefined schedule (e.g., each week, every two weeks, each month, etc.).

Unfortunately, these frequently deployed upgrades increase a likelihood of introducing or causing regressions, which may be referred to herein as problems, that can result in functionality loss and/or sub-optimal experiences for the users being served by the resources executing the updated code. Typically, an entity providing the service uses an engineering team to manually monitor telemetry data associated with the health of the resources in order to identify an anomaly that signals a problem, and to determine a root cause of the problem. More specifically, the engineering team includes analysts that investigate problems with the updated code being executed on the resources in order to determine whether mitigation actions need to be taken to resolve the problems.

However, determining whether a problem is caused by upgrades deployed to a number of resources, rather than some other disruptive event that may be localized to a particular resource, has proven to be exceedingly difficult. This is because there is a large number of different metrics of the service that need to be monitored. For instance, an analyst on the engineering team is typically required to diagnose the root cause of a problem by reviewing and interpreting endless logs of telemetry data that show variations and/or deviations for a large number of metrics associated with the resources. This manual review and interpretation is time consuming and largely ineffective particularly because many cloud-based platforms are growing rapidly (e.g., server farms increase in size and/or are continually added to expand the service being provided). Consequently, this growth often outpaces the manual monitoring capacity required to identify and to take action to mitigate a problem in an efficient manner.

It is with respect to these and other considerations that the disclosure made herein is presented.

SUMMARY

The techniques disclosed herein automate the causality detection process when upgrades are deployed to different resources that provide a service to users. The resources can include physical and/or virtual resources (e.g., processing, storage, and/or networking resources) that are divided into different, geographically dispersed, resource "units". For example, the resource units may be different server farms configured within the same and/or different datacenters. An individual upgrade that is deployed to these different resource units is referred to herein as an upgrade event. As described above, an upgrade event may include updated code and/or other mechanisms configured to maintain, correct, add, and/or remove functionality associated with the service provided.

In various examples, the upgrade event may be deployed (e.g., pushed) to the different resource units in a sequence. This sequential approach to deploying an upgrade event makes it possible to identify and take action to mitigate a problem for which the upgrade event is the root cause before the upgrade event is deployed to all of the resource units that make up the cloud-based platform. Stated alternatively, exposure of the problem to end users can be limited if a problem is identified and mitigated early in the process of sequentially deploying the upgrade event to the different resource units.

To identify the problem, the system described herein collects, or receives, telemetry data from each of the resource units that make up the cloud-based platform. The telemetry data includes data values for various metrics that are being monitored. The metrics being monitored may be indicative of a "health" of an individual resource unit. When healthy, the service being offered by the individual resource unit is functioning effectively and efficiently, thereby translating into an optimal user experience. However, when not healthy, the service being offered by the individual resource unit may be slow or unavailable, thereby translating into a sub-optimal user experience.

The system described herein can monitor and use any one of various metrics that are indicative of a health of a resource unit. In one example, a metric may include an unexpected number of errors that occur for a predefined time period (e.g., each minute, every five minutes, etc.). An unexpected error may be reported by a user of the service. For instance, a customer may provide feedback indicating that a requested operation was slow to be completed or unable to be completed. Alternatively, an unexpected error may be system detected. For instance, an automated detection feature of the service may determine that a particular function provided via the service is unavailable due to a crash that occurs at a particular resource unit. In another example, a metric may include a Quality of Service (QoS) value established in accordance with any one of various QoS models used by the cloud-based platform. The QoS value is a measurement of the performance of the service for users during a predefined time period (e.g., each minute, every five minutes, etc.) based on monitored characteristics such as packet loss, bit rate, throughput, transmission delay, availability, and so forth.

To determine whether a root cause of a problem is associated with an upgrade event that has recently been deployed, the system is configured to use the telemetry data to compute an "upgrade-to-upgrade" score that is specific to an individual resource unit. The upgrade-to-upgrade score is indicative of, or represents, a difference between a set of values associated with a previous upgrade event that was deployed to the individual resource unit (e.g., last week's upgrade) and a set of values associated with a current upgrade event that was recently deployed to the individual resource unit (e.g., this week's upgrade). Both sets of values include telemetry data received for the individual resource unit for a time period (e.g., thirty minutes, one hour, five hours, twelve hours, etc.) before the respective upgrade event is deployed to the individual resource unit and for a time period (e.g., thirty minutes, one hour, five hours, twelve hours, etc.) after the respective upgrade event is deployed to the individual resource unit. These time periods before and after an upgrade event is deployed may be the same or different, as long as the time periods allow for the collection and/or sampling of a sufficient amount of telemetry data useable to evaluate the effect the deployment of a respective upgrade event has on a resource unit. Consequently, the system is configured to use the telemetry data to compare the effects of two different upgrade events deployed to the same resource unit.

The upgrade-to-upgrade score may be computed by the system in response to detection of an anomaly in the telemetry data received for an individual resource unit. For example, a deviation, such as a spike or a drop in a metric being monitored, that occurs after deployment of the current upgrade event may amount to an anomaly in the telemetry data that signals a problem. The upgrade-to-upgrade score may be used to determine whether the deviation is common to the individual resource unit when upgrade events are deployed. That is, the deviation may be a consequence of a localized environmental factor specific to a particular resource unit rather than a consequence of defective code being pushed to multiple resource units via the current upgrade event. Accordingly, if the upgrade-to-upgrade score does not exceed a difference threshold established for an upgrade-to-upgrade comparison (e.g., the comparison shows little change in telemetry data from one upgrade event to the next), then the system determines that the detected anomaly in the telemetry data is likely common to a particular resource unit. For instance, the detected anomaly is likely caused by an aforementioned localized environmental factor (e.g., a time of week when the upgrade event is deployed) rather than the updated code included in the currently deployed upgrade event.

Previously, in this situation in which an anomaly is detected for an individual resource unit, an alert would be sent to an analyst that is part of an engineering team. The alert may falsely indicate that the currently deployed upgrade event is possibly the root cause of the problem. Via the techniques described herein, the alert is suppressed due to the detected commonality in deviations that occur with respect to a particular resource unit from one upgrade event to the next. This commonality signals that the currently deployed upgrade event is not the root cause of the problem. By suppressing the alert, computing resources are saved and the manual workload of the analyst is reduced.

In other instances, the system may determine that the upgrade-to-upgrade score for the individual resource unit exceeds the difference threshold established for the upgrade-to-upgrade comparison (e.g., the comparison shows significant changes in telemetry data from one upgrade event to the next). In this scenario, the system takes further action to determine and/or verify whether a problem is likely caused by the currently deployed upgrade event. To do this, the system identifies a group of other resource units (e.g., ten other resource units, twenty other resource units, etc.) in the cloud-based platform to which the current upgrade event has been deployed. The system is configured to use the telemetry data to compute an "upgrade unit-to-unit" score that is indicative of, or that represents, a difference between a set of values associated with the current upgrade event that was deployed to the individual resource unit for which the anomaly is detected and a set of values associated with the current upgrade event being deployed to each other resource unit in the group. Both sets of values include telemetry data received for a respective resource unit for a time period (e.g., thirty minutes, one hour, five hours, twelve hours, etc.) before the current upgrade event is deployed and for a time period (e.g., thirty minutes, one hour, five hours, twelve hours, etc.) after the current upgrade event is deployed. Again, these time periods before and after the current upgrade event is deployed to two different resource units may be the same or different. Consequently, the system is configured to use the telemetry data to compare the effects of the current upgrade event deployed to different resource units.

Since an upgrade unit-to-unit score is computed for each of the other resource units, the system computes multiple upgrade unit-to-unit scores. Next, the system determines whether each of the multiple upgrade unit-to-unit scores exceeds a difference threshold established for the upgrade unit-to-unit comparison and tracks the number of upgrade unit-to-unit scores that exceed the difference threshold. In some implementations, the system waits until a minimum number of resource units have been upgraded via the sequential rollout (e.g., ten percent of a total number of resource units that make up the cloud-based platform, twenty percent of the total number of resource units that make up the cloud-based platform, etc.) before comparing the upgrade unit-to-unit scores to the difference threshold established for the upgrade unit-to-unit comparison and tracking the number of upgrade unit-to-unit scores that exceed the difference threshold.

In various examples, responsive to determining that the number of the upgrade unit-to-unit scores that exceed the difference threshold is less than or equal to a predefined minimum number, the system confidently determines that the current upgrade event is the root cause of a problem. Stated alternatively, the comparison shows little change in telemetry data across the resource units that have received the current upgrade event, and therefore, a problem related to the code in the current upgrade event is noticed on each of the resource units executing the updated code. In one example, the predefined minimum number is zero, and thus, none of the upgrade unit-to-unit scores can exceed the difference threshold in order for the system to confidently determine that the current upgrade event is the root cause of a problem. In other examples, the predefined minimum number is a different number (e.g., one, two, three, etc.), and thus, as long the number of upgrade unit-to-unit scores that exceed the difference threshold is less than or equal to the predefined minimum number, the system can confidently determine that the current upgrade event is the root cause of a problem. The system then causes an alert that signals the current upgrade event is the root cause of the problem to be output. The alert may be output via a graphical user interface of a device associated with an analyst so the analyst can take further action to mitigate the problem (e.g., inform a developer that a fix may need to be applied to the updated code).

In various examples, responsive to determining that the number of the upgrade unit-to-unit scores that exceed the difference threshold is greater than or equal to a predefined maximum number, the system confidently determines that the individual resource unit for which the anomaly was initially detected is the root cause of the problem (e.g., some localized environment factor is likely affecting the user experience), and not the currently deployed upgrade event. Stated alternatively, the comparison shows significant changes between the telemetry data for the individual resource unit and the other resource units that have also received the current upgrade event. In one example, the predefined maximum number is set to a total number of the resource units that have already received the current upgrade event, and thus, all of the upgrade unit-to-unit scores need to exceed the difference threshold in order for the system to confidently determine that the current upgrade event is not the root cause of a problem. In other examples, the predefined maximum number is a different number (e.g., one less than the total number of the resource units that have already received the current upgrade event, two less than the total number of the resource units that have already received the current upgrade event, etc.), and thus, as long the number of upgrade unit-to-unit scores that exceed the difference threshold is greater than or equal to the predefined maximum number, the system can confidently determine that the individual resource unit for which the anomaly was initially detected is the root cause of the problem. Consequently, the system determines that the problem is localized to the individual resource unit and is not caused by the current upgrade event. In this case, the system causes an alert that signals the problem is associated with the individual resource unit to be output.

In various examples, responsive to determining that the number of the upgrade unit-to-unit scores that exceed the difference threshold is between the predefined minimum number and the predefined maximum number, the system may cause an indication that further investigation is warranted to be output via a graphical user interface of a device associated with an analyst. Stated alternatively, this determination provides mixed signals, and thus, an alert may request that an analyst further spend the time necessary to investigate and to understand the reasons for the initial anomaly detected in the telemetry data for the individual resource unit.

As described above, and further discussed herein, the disclosed system provides a more effective and efficient way of assisting an analyst in identifying whether a detected anomaly is caused by a problem with updated code being pushed to different resource units (e.g., server farms) via a recent upgrade event, or is caused by some environment factor that is local to a particular resource unit for which the anomaly in the telemetry data is detected. This identification can be implemented early in the process of deploying the upgrade event across a large number of resource units (e.g., hundreds of server farms), and thus the techniques described herein can be used to limit the exposure of defective code to users of a cloud-based platform.

The upgrade-to-upgrade score computed for an individual resource unit and the upgrade unit-to-unit score computed for a pair of resource units that have received the same upgrade event can be computed using a scoring model. In various examples, the scoring model includes a comparator function that is configured to map two matrices, where each matrix includes a set of telemetry values, to a normalized value. For instance, the comparator function can be a Siamese Neural Network or a Multivariate Gaussian Distribution.

Furthermore, the telemetry data can include another metric, such as a total number of user requests, to ensure that the metrics used to determine the health of a resource unit are being evaluated under normal usage of the service. Accordingly, the system may only rely upon each of the upgrade-to-upgrade score and the upgrade unit-to-unit scores, computed using health signaling metric values such as the number of expected errors or QoS values, when the total number of user requests indicates normal usage of the service with respect to an individual resource unit. Normal usage can be determined based in historical data associated with a resource unit.

To further solidify the confidence of a determination that the current upgrade event is the root cause of the problem, the system may also compare telemetry data for the individual resource unit to telemetry data for other resources units that have not yet received the current upgrade event. Accordingly, the system identifies another group of other resource units in the cloud-based platform to which the current upgrade event has not been deployed. The system is configured to use the telemetry data to compute a "non-upgrade unit-to-unit" score that is indicative of, or that represents, a difference between a set of values associated with the current upgrade event that was deployed to the individual resource unit for which the anomaly is detected and a set of values associated with each non-upgraded resource unit. Both sets of values include telemetry data received during a time period (e.g., thirty minutes, one hour, five hours, twelve hours, etc.) before the current upgrade event is deployed to the individual resource unit and for a time period (e.g., thirty minutes, one hour, five hours, twelve hours, etc.) after the current upgrade event is deployed to the individual resource unit. Again, these time periods before and after the current upgrade event is deployed to the individual resource unit may be the same or different. Consequently, the system is configured to use the telemetry data to compare the effects of the current upgrade event to different resource units—one that has received the upgrade event and one that has not received the upgrade event.

Since a non-upgrade unit-to-unit score is computed for each of the non-upgraded resource units, the system computes multiple non-upgrade unit-to-unit scores. Next, the system determines whether each of the multiple non-upgrade unit-to-unit scores exceeds a difference threshold established for the non-upgrade unit-to-unit comparison and tracks the number of non-upgrade unit-to-unit scores that exceed the difference threshold.

In various examples, responsive to determining that the number of non-upgrade unit-to-unit scores that exceed the difference threshold is greater than or equal to the predefined maximum number discussed above, the system adds an indication of confidence to the alert signaling that the current upgrade event is the cause of the problem. This happens because significant changes have been detected between the telemetry data for the upgraded individual resource unit associated with the anomaly and non-upgraded resource units. In various examples, responsive to determining that the number of non-upgrade unit-to-unit scores that exceed the difference threshold is less than or equal to the predefined minimum number discussed above, the system may suppress the alert signaling that the current upgrade event is the cause of the problem. This happens because now there may be mixed signals as to the source or cause of the problem.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

FIG. 3A is an example graphical user interface illustrating how an alert indicating that the current upgrade event is likely the cause of a problem can be displayed to an analyst.

FIG. 3B is an example graphical user interface illustrating how an alert indicating that the current upgrade event is likely not the cause of a problem can be displayed to an analyst.

FIG. 4 is a flow diagram of an example method for determining an upgrade-to-upgrade score for an individual resource unit and determining whether the upgrade-to-upgrade score signals that a current upgrade event is the cause of a problem.

DETAILED DESCRIPTION

The following Detailed Description discloses techniques and technologies for automating the causality detection process when upgrades are deployed to different resources that provide a service to users. The resources can include physical and/or virtual resources (e.g., processing, storage, and/or networking resources) that are divided into different, geographically dispersed, resource "units". For example, the resource units may be different server farms configured within the same and/or different datacenters. An upgrade event may include updated code and/or other mechanisms configured to maintain, correct, add, and/or remove functionality associated with the service provided.

To determine whether a root cause of a problem is associated with an upgrade event that has recently been deployed, the system described herein is configured to use telemetry data to compute an "upgrade-to-upgrade" score that represents health differences between two different upgrade events that are deployed to the same resource unit. The system is further configured to use telemetry data to compute an "upgrade unit-to-unit" score that represents health differences between the same upgrade event that has been deployed to two different resource units. Finally, the system is also configured to use telemetry data to compute a "non-upgrade unit-to-unit" score that represents health differences, for a period of time, between a resource unit that has received a current upgrade event and a resource unit that has not received the current upgrade event.

Various examples, scenarios, and aspects that effectively determine whether a detected anomaly in telemetry data being monitored is likely caused by a recent upgrade event deployed to a resource unit, and output an alert for an analyst based on the determination, are described below with reference to FIGS. 1-8.

Figure 1:
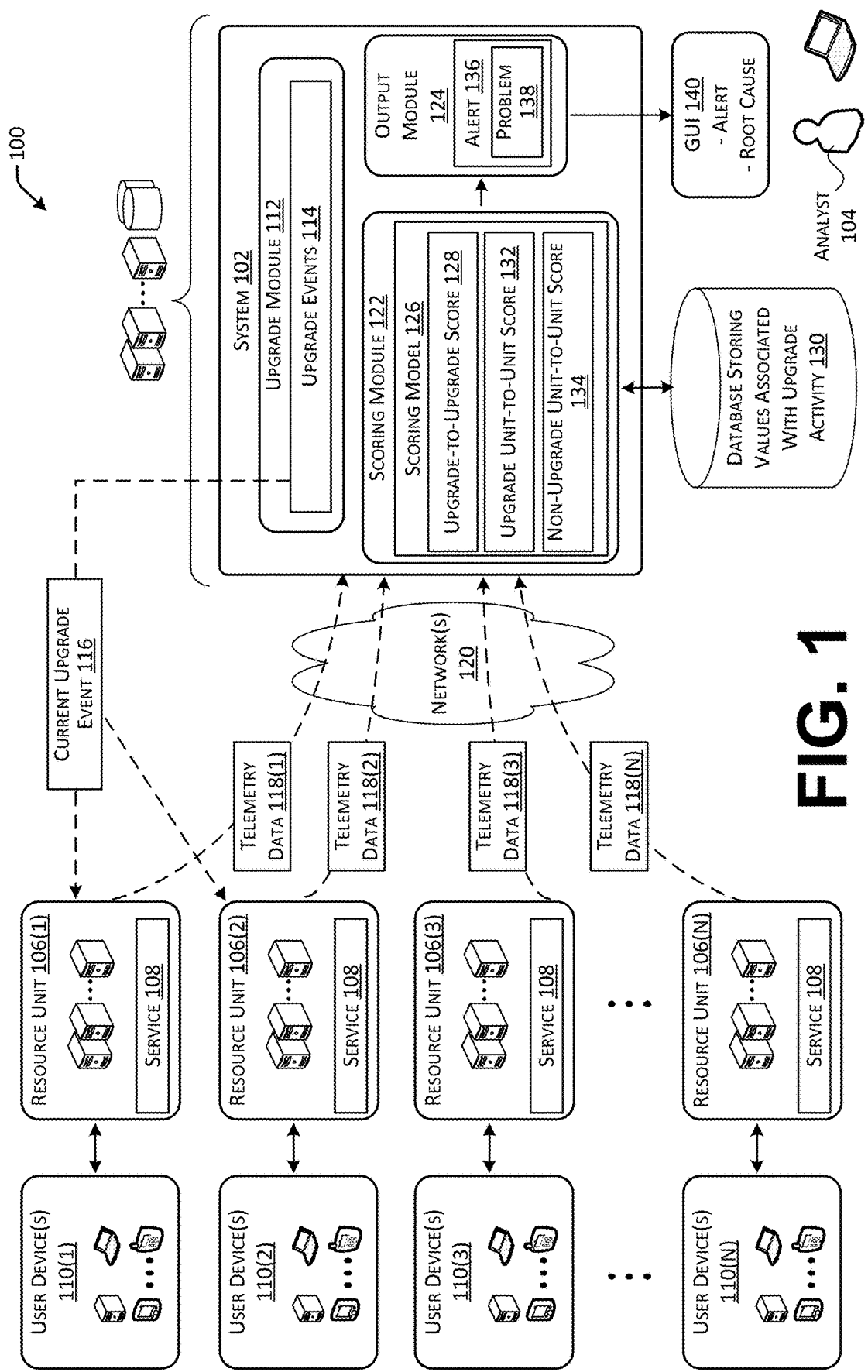
FIG. 1 is a diagram illustrating an example environment in which a system is configured to determine whether a detected anomaly in telemetry data being monitored is likely caused by a recent upgrade event being deployed to a resource unit, and to output an alert for an analyst based on the determination.

FIG. 1 is a diagram illustrating an example environment 100 in which a system 102 is configured to determine whether a detected anomaly in telemetry data being monitored is likely caused by a recent upgrade event being deployed to a resource unit, and to output an alert for an analyst based on the determination. The system 102 is configured to generate and display an alert so that an analyst 104 can determine whether mitigation actions should be taken in association with a recently deployed upgrade event. For instance, the analyst 104 can notify developers that deployment of the upgrade event should be stopped and/or that a code fix may need to be implemented upon further investigation of the problem.

FIG. 1 illustrates various resource units 106(1)-106(N) where N is a positive integer number (e.g., in the hundreds or thousands). The resource units 106(1)-106(N) may be different server farms, or some other division of resources, that comprise a cloud-based platform and that are configured within the same and/or different datacenters. Accordingly, a resource can include a server, a storage device, a virtual machine, a virtual network, networking equipment, and so forth, that is under control of an entity providing a service 108 and/or operating the system 102 configured to monitor the health of the service 108. To this end, each of the resource units 106(1)-106(N) provide the service 108 to respective user devices 110(1)-110(N) located in different geographical regions (e.g., different states, different countries, etc.). A user device may include an "on-premises" server device, a smartphone device, tablet computing device, a laptop computing device, a desktop computing device, an augmented reality device, a virtual reality device, a mixed reality device, a game console, a wearable device, an Internet-of-Things (IoT) device, and so forth.

The system 102 includes an upgrade module 112 that is configured to deploy (e.g., push) scheduled upgrade events 114 (e.g., each week, every two weeks, each month, etc.) to the different resource units 106(1)-106(N). An individual upgrade event is often deployed to the resource units 106(1)-106(N) in a sequence. Accordingly, FIG. 1 shows that at a particular point in time, the current upgrade event 116 has been deployed to resource unit 106(1) and resource unit 106(2), but not to resource unit 106(3) and resource unit 106(N). Again, this sequential approach to deploying the current upgrade event 116 makes it possible for the system 102 and/or the analyst 104 to identify and take action to mitigate a problem for which the current upgrade event 116 is the root cause before the current upgrade event 116 is deployed to all of the resource units 106(1)-106(N) that make up a cloud-based platform (e.g., GOOGLE DRIVE, MICROSOFT SHAREPOINT, DROPBOX, etc.). Stated alternatively, exposure of the problem to end users, e.g., user devices 110(1)-110(N), can be limited if a problem is identified and mitigated early in the process of sequentially deploying the current upgrade event 116 to the different resource units 106(1)-106(N).

To identify the problem, the system 102 continually collects, or receives, telemetry data 118(1)-118(N) from the respective resource units 106(1)-106(N) that make up the cloud-based platform. The system 102 can comprise device(s) (e.g., servers, analyst devices, etc.) and/or other components that communicate with one another and/or with the resource units 106(1)-106(N) via network(s) 120. Moreover, the system 102 can include a scoring module 122 and an output module 124. The number of illustrated modules in the system 102 is just an example, and the number can vary higher or lower. That is, functionality described herein in association with the illustrated modules can be performed by a fewer number of modules or a larger number of modules on one device or spread across multiple devices.

The telemetry data 118(1)-118(N) includes data values for various metrics that are being monitored. The metrics being monitored may be indicative of a "health" of an individual resource unit. When healthy, the service 108 being offered by the individual resource unit is functioning effectively and efficiently, thereby translating into an optimal user experience. However, when not healthy, the service 108 being offered by the individual resource unit may be slow or unavailable, thereby translating into a sub-optimal user experience.

Accordingly, the system monitors any one of various metrics that are indicative of the health of each of the resource units 106(1)-106(N). In one example, a metric may include an unexpected number of errors that occur for a predefined time period (e.g., each minute, every five minutes, etc.). An unexpected error may be reported by a user of the service 108. For instance, a customer may provide feedback indicating that a requested operation was slow to be completed or unable to be completed. Alternatively, an unexpected error may be system detected. For instance, an automated detection feature of the service 108 may determine that a particular function provided via the service 108 is unavailable due to a crash that occurs at a particular resource unit.

In another example, a metric may include a Quality of Service (QoS) value established in accordance with any one of various QoS models used by the cloud-based platform. The QoS value is a measurement of the performance of the service 108 for users during a predefined time period (e.g., each minute, every five minutes, etc.) based on monitored characteristics such as packet loss, bit rate, throughput, transmission delay, availability, and so forth.

The system 102 is configured to detect an anomaly in the telemetry data 118(2) received for an individual resource unit 106(2) that has received the current upgrade event 116. For example, a deviation, such as a spike or a drop in a metric being monitored, that occurs after deployment of the current upgrade event 116 may amount to an anomaly in the telemetry data 118(2). The detected anomaly signals that there may be a problem for which a root cause should be identified.

To determine whether a root cause of the problem is associated with the current upgrade event 116, the system 102 is configured to use the telemetry data 118(2) and a scoring model 126 to compute an "upgrade-to-upgrade" score 128 for the resource unit 106(2). The upgrade-to-upgrade score 128 is indicative of, or represents, a difference between a set of telemetry values associated with a previous upgrade event that was deployed to the resource unit 106(2) (e.g., last week's upgrade) and a set of telemetry values associated with the current upgrade event 116 that was recently deployed to the same resource unit 106(2) (e.g., this week's upgrade), as further described herein with respect to FIG. 2A. FIG. 1 also illustrates a database 130 that stores telemetry data (e.g., sampled values) associated with previous upgrade events that were deployed by the upgrade module 112, prior to the current upgrade event 116.

Further, the system 102 use the telemetry data 118(2) and 118(1) and the scoring model 126 to compute an "upgrade unit-to-unit" score 132. The upgrade unit-to-unit score 132 is indicative of, or represents, a difference between a set of telemetry values associated with the current upgrade event 116 that was recently deployed to resource unit 106(2) and a set of telemetry values associated with the current upgrade event 116 that was recently deployed to another resource unit that has already received the current upgrade event 116, such as resource unit 106(1), as further described herein with respect to FIG. 2B.

In various embodiments, the system 102 use the telemetry data 118(2) and 118(3) and the scoring model 126 to compute an "non-upgrade unit-to-unit" score 134. The non-upgrade unit-to-unit score 134 is indicative of, or represents, a difference between a set of telemetry values associated with the current upgrade event 116 that was recently deployed to resource unit 106(2) and a set of telemetry values associated with another resource unit that has not yet received the current upgrade event 116, such as resource unit 106(3), as further described herein with respect to FIG. 2C.

As further described herein, the scoring module 122 uses the upgrade-to-upgrade score 128, the upgrade unit-to unit scores 132, and/or the non-upgrade unit-to-unit scores 134 to determine whether the detected anomaly for resource unit 106(2) is likely caused by a problem in the updated code pushed to the resource unit 106(2) via the current upgrade event 116. Consequently, the output module 124 is configured to generate an alert 136 that signals a likely root cause of the problem 138, and to cause the alert 136 to be output (e.g., displayed) via a graphical user interface 140 so it can be reviewed by the analyst 104.

Figure 2A:
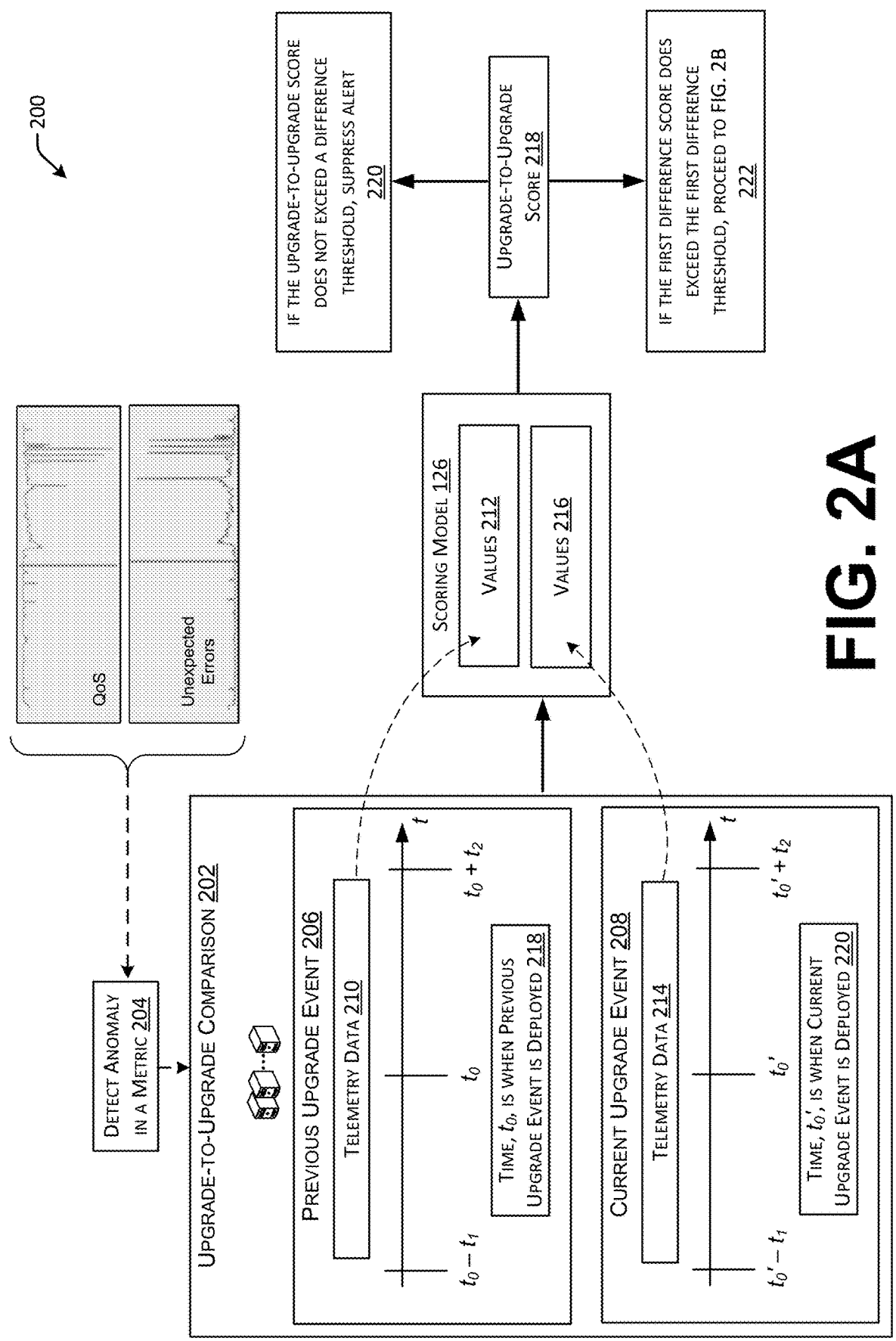
FIG. 2A is a block diagram illustrating how an upgrade-to-upgrade score is computed in response to detection of an anomaly in the telemetry data received for an individual resource unit.

FIG. 2A shows a block diagram 200 that illustrates how an upgrade-to-upgrade comparison 202 is used to compute an upgrade-to-upgrade score in response to detection of an anomaly 204 in the telemetry data (e.g., 118(2)) received for an individual resource unit (e.g., 106(2)). As illustrated, the anomaly may be detected when a number of unexpected errors significantly increases and/or a QoS value significantly decreases after deployment of the current upgrade event 116.

As described above, the upgrade-to-upgrade score is indicative of, or represents, a difference between a set of telemetry values associated with a previous upgrade event 206 that was deployed to the individual resource unit 106(2) (e.g., last week's upgrade) and a set of telemetry values associated with the current upgrade event 208 (e.g., upgrade event 116) that was recently deployed to the individual resource unit 106(2) (e.g., this week's upgrade). To this end, FIG. 2A illustrates that telemetry data 210 is collected in association with a time period when the previous upgrade event 206 was deployed to the resource unit 106(2), and telemetry data 210 includes sampled values 212 provided to the scoring model 126. Similarly, telemetry data 214 is collected in association with a time period when the current upgrade event 208 was deployed to the same resource unit 106(2), and telemetry data 214 includes sampled values 216 provided to the scoring model 126.

As illustrated in FIG. 2A, $t_0$ is a time when the previous upgrade event is deployed 218 to resource unit 106(2) and $t_0'$ is a time when the current upgrade event is deployed 220 to resource unit 106(2). Accordingly, both sets of values 212 and 216 include telemetry data received in association with resource unit 106(2) for a time period before a respective upgrade event is deployed to resource unit 106(2) (e.g., $t_0-1$, $t_0'-1$). This time period may be thirty minutes, one hour, five hours, twelve hours, etc., as long as the amount of time is sufficient enough to capture enough sampled values to provide a good indication of the health of the resource unit 106(2) before deployment of a respective upgrade event.

Similarly, both sets of values 212 and 216 include telemetry data received in association with resource unit 106(2) for a time period after a respective upgrade event is deployed to resource unit 106(2) (e.g., $t_0+2$, $t_0'+2$). This time period may be equal or different to the time period before a respective upgrade event is deployed, and thus, may be thirty minutes, one hour, five hours, twelve hours, etc., as long as the amount of time is sufficient enough to capture enough sampled values to provide a good indication of the health of the resource unit 106(2) after deployment of a respective upgrade event.

The scoring model 126 then uses the values 212 and 216 to compute the upgrade-to-upgrade score 218 for the resource unit 106(2). In various examples, the scoring model 126 includes a comparator function that is configured to map two matrices, where each matrix includes a set of values 212 or 216 to a normalized value that represents a difference between the two sets of values 212 and 216. For instance, the comparator function can be a Siamese Neural Network or a Multivariate Gaussian Distribution. The scoring model 126 may compute the upgrade-to-upgrade score 218 for the resource unit 106(2) using telemetry data for certain health signaling metrics (e.g., number of unexpected errors, QoS values, etc.) when a total number of user requests indicates normal usage of the service with respect the resource unit 106(2). Normal usage can be determined based on historical data associated with a resource unit.

The upgrade-to-upgrade score 218 may be used to determine whether the deviation recognized in a monitored metric is common to the resource unit 106(2) across deployment of multiple upgrade events. That is, the deviation may be a consequence of a localized environmental factor specific to the resource unit 106(2) rather than a consequence of defective code being pushed to the resource units 106(1)-106(N) via the current upgrade event 208.

The scoring module 122 is configured to compare the upgrade-to-upgrade score 218 to a difference threshold established for the upgrade-to-upgrade comparison 202 (e.g., five percent difference, ten percent difference). The difference threshold can be established to accommodate expected variations in telemetry data from one deployed upgrade event to the next. In other words, the difference threshold can be established to identify significant or unexpected variations in telemetry data from one deployed upgrade event to the next.

Accordingly, if the upgrade-to-upgrade score 218 does not exceed the difference threshold, e.g., the comparison shows little change in sampled telemetry values from one upgrade event to the next, the scoring module 122 determines that the detected anomaly in the telemetry data is likely common to resource unit 106(2) and suppresses the output of an alert that signals the current upgrade event as the root cause of a problem 220. Rather, the detected anomaly is likely caused by some localized environmental factor (e.g., a time of week when the upgrade event is deployed) rather than the updated code included in the currently deployed upgrade event 116.

Previously, in this situation in which an anomaly is detected for an individual resource unit, an alert would be sent to an analyst that is part of an engineering team. The alert may falsely indicate that the currently deployed upgrade event is the root cause of the problem. In contrast, the techniques described herein suppress the alert due to the detected commonality in deviations that occur with respect to a specific resource unit from one upgrade event to the next. This commonality signals that the currently deployed upgrade event is not the root cause of the problem. By suppressing the alert, computing resources are saved, and the manual workload of the analyst is reduced.

Figure 2B:
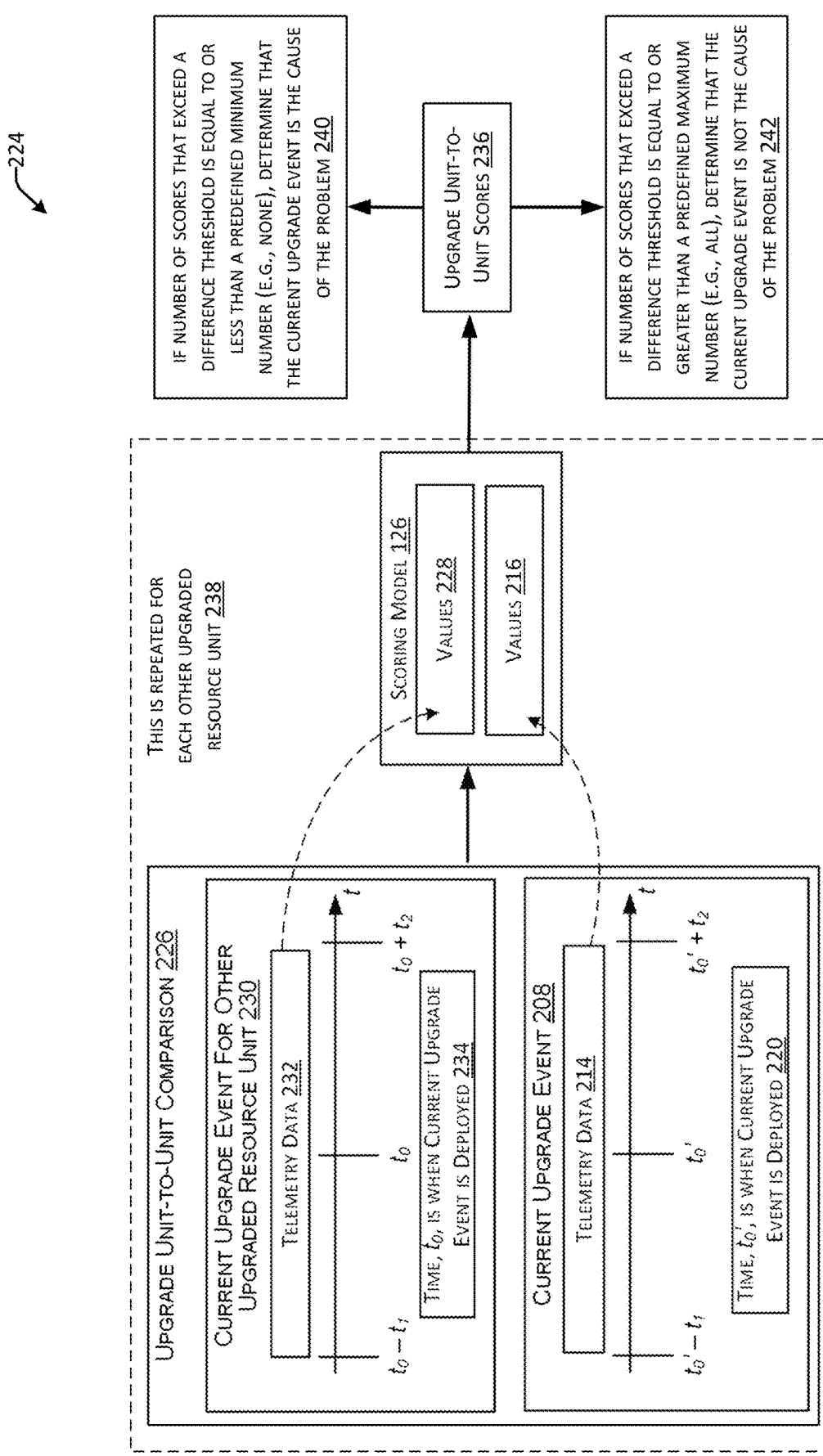
FIG. 2B is a block diagram illustrating how an upgrade unit-to-unit score is computed by comparing telemetry data received for two resource units that have both received a current upgrade event.

If the upgrade-to-upgrade score 218 does exceed the difference threshold, e.g., the comparison shows significant changes in telemetry data from one upgrade event to the next, the scoring module 122 moves to implement the operations in the block diagram of FIG. 2B, as referenced by 222. That is, the scoring module 122 takes further action to determine and/or verify whether a problem is likely caused by the current upgrade event 116.

FIG. 2B is a block diagram 224 illustrating how an upgrade unit-to-unit score is computed by implementing an upgrade unit-to-unit comparison 226 of telemetry data received for two resource units that have both received a current upgrade event. The scoring module 122 first identifies a group of other resource units (e.g., ten other resource units, twenty other resource units, etc.) in the cloud-based platform to which the current upgrade event has been deployed. In the example of FIG. 1, resource unit 106(1) is in this group of other resource units to which the current upgrade event 116 has been deployed.

As described above, the upgrade unit-to-unit score is indicative of, or that represents, a difference between the set of values 216 associated with the current upgrade event 208 that was deployed to the individual resource unit 106(2) for which the anomaly is detected (similarly illustrated in FIG. 2A) and a new set of values 228 associated with the current upgrade event being deployed to another upgraded resource unit 230 in the group. To this end, FIG. 2B illustrates that telemetry data 232 is collected in association with a time period when the current upgrade event was deployed to the resource unit 106(1), and telemetry data 232 includes sampled values 228 provided to the scoring model 126.

As illustrated in FIG. 2B, $t_0$ is a time when the current upgrade event is deployed 234 to resource unit 106(1) and, similar to FIG. 2A, $t_0'$ is a time when the current upgrade event is deployed 220 to resource unit 106(2). Accordingly, both sets of values 228 and 216 include telemetry data received in association with two respective upgraded resource units for a time period before a respective upgrade event is deployed to a respective resource unit (e.g., $t_0-1$, $t_0'-1$). This time period may be thirty minutes, one hour, five hours, twelve hours, etc., as long as the amount of time is sufficient enough to capture enough sampled values to provide a good indication of the health of the respective resource units before deployment of the current upgrade event.

Similarly, both sets of values 228 and 216 include telemetry data received in association with two respective upgraded resource units for a time period after a respective upgrade event is deployed to a respective resource unit (e.g., $t_0+2$, $t_0'+2$). This time period may be equal or different to the time period before a respective upgrade event is deployed, and thus, may be thirty minutes, one hour, five hours, twelve hours, etc., as long as the amount of time is sufficient enough to capture enough sampled values to provide a good indication of the health of the respective resource units after deployment of the current upgrade event.

The scoring model 126 then uses the values 228 and 216 to compute the upgrade unit-to-unit score 236 based on the upgrade unit-to-unit comparison 226 conducted for resource units 106(1) and 106(2). As reference by 238, an upgrade unit-to-unit comparison 226 is repeated for each other updated resource unit that is included in the identified group.

The scoring model 126 may compute the upgrade unit-to-unit score 236 for resource units 106(1) and 106(2) using telemetry data for certain health signaling metrics (e.g., number of unexpected errors, QoS values, etc.) when a total number of user requests indicates normal usage of the service with respect the resource units 106(1) and 106(2). Normal usage can be determined based on historical data associated with a resource unit.

Since an upgrade unit-to-unit score 236 is computed for each of the other upgraded resource units, the scoring model 126 computes multiple upgrade unit-to-unit scores 236. Next, the scoring module 122 determines whether each of the multiple upgrade unit-to-unit scores 236 exceeds a difference threshold established for the upgrade unit-to-unit comparison 226 (e.g., five percent difference, ten percent difference). The difference threshold can be established to accommodate expected variations in telemetry data when the same upgrade event is deployed across two different resource units. In other words, the difference threshold can be established to identify significant or unexpected variations in telemetry data when the same upgrade event is deployed across two different resource units.

The scoring module 122 determines or tracks the number of upgrade unit-to-unit scores 236 that exceed the difference threshold. In some implementations, the scoring module 122 waits until a minimum number of other resource units have been upgraded via the sequential rollout (e.g., ten percent of a total number of resource units that make up the cloud-based platform, twenty percent of the total number of resource units that make up the cloud-based platform, etc.) before comparing the upgrade unit-to-unit scores 236 to the difference threshold established for the upgrade unit-to-unit comparison 226.

In various examples, responsive to determining that the number of the upgrade unit-to-unit scores 236 that exceed the difference threshold is less than or equal to a predefined minimum number, the scoring module 122 confidently determines that the current upgrade event 116 is the root cause of a problem, as referenced by 240. Stated alternatively, the upgrade unit-to-unit comparisons 226 show little change in telemetry data across the resource units that have received the current upgrade event 116, and therefore, a problem related to the code in the current upgrade event 116 is noticed on each of the resource units executing the updated code.

In one example, the predefined minimum number is zero, and thus, none of the upgrade unit-to-unit scores 236 can exceed the difference threshold in order for the scoring module 122 to confidently determine that the current upgrade event 116 is the root cause of a problem. In other examples, the predefined minimum number is a different number (e.g., one, two, three, etc.), and thus, as long the number of upgrade unit-to-unit scores 236 that exceed the difference threshold is less than or equal to the predefined minimum number, the scoring module 122 can confidently determine that the current upgrade event is the root cause of a problem. The scoring module 122 then causes an alert that signals the current upgrade event 116 is the root cause of the problem to be output.

In various examples, responsive to determining that the number of the upgrade unit-to-unit scores 236 that exceed the difference threshold is greater than or equal to a predefined maximum number, the scoring module 122 confidently determines that the current upgrade event is not the cause of the problem, as referenced by 242. Rather, the scoring module 122 determines that the individual resource unit 106(2) for which the anomaly was initially detected is likely the root cause of the problem (e.g., some localized environment factor is likely affecting the user experience). Stated alternatively, the upgrade unit-to-unit comparisons 226 show significant changes between the telemetry data across the resource units that have received the current upgrade event 116, and therefore, a problem related to the code in the current upgrade event 116 is not noticed on each of the resource units executing the updated code.

In one example, the predefined maximum number is set to a total number of the resource units that have already received the current upgrade event, and thus, all of the upgrade unit-to-unit scores 236 need to exceed the difference threshold in order for the scoring module 122 to confidently determine that the current upgrade event 116 is not the root cause of a problem. In other examples, the predefined maximum number is a different number (e.g., one less than the total number of the resource units that have already received the current upgrade event, two less than the total number of the resource units that have already received the current upgrade event, etc.), and thus, as long the number of upgrade unit-to-unit scores 236 that exceed the difference threshold is greater than or equal to the predefined maximum number, the scoring module 122 can confidently determine that the current upgrade event 116 is not the cause of the problem, but rather, the individual resource unit 106(2) for which the anomaly was initially detected is the root cause of the problem. Consequently, the system determines that the problem is localized to the individual resource unit and is not caused by the current upgrade event. In this case, the system causes an alert that signals the problem is associated with the individual resource unit to be output.

In various examples, responsive to determining that the number of the upgrade unit-to-unit scores 236 that exceed the difference threshold is between the predefined minimum number and the predefined maximum number, the scoring module 122 may cause an indication that further investigation is warranted to be output via a graphical user interface of a device associated with an analyst. Stated alternatively, this determination provides mixed signals, and thus, an alert may request that an analyst further spend the time necessary to investigate and to understand the reasons for the initial anomaly detected in the telemetry data for the individual resource unit.

Consequently, the disclosed system provides a more effective and efficient way of assisting an analyst in identifying whether a detected anomaly is caused by a problem with updated code being pushed to different resource units (e.g., server farms) via a recent upgrade event, or is caused by some environment factor that is local to a particular resource unit for which the anomaly in the telemetry data is detected. This identification can be implemented early in the process of deploying the upgrade event across a large number of resource units (e.g., hundreds of server farms), and thus, the techniques described herein can be used to limit the exposure of defective code to users of a cloud-based platform.

As described above, the scoring model 126 includes a comparator function that is configured to map two matrices, where each matrix includes a set of values or to a normalized value that represents a difference between the two sets of values and. For instance, the comparator function can be a Siamese Neural Network or a Multivariate Gaussian Distribution.

The following provides an example of algorithm(s) and/or functions used by the scoring model 126. A plurality of resource units that make up a cloud-based platform can be represented as $F=\{F_1, \ldots, F_N\}$. At a given time $t^*$, let $F^+ \subset F$ denote the group of resource units to which a recent, or current, upgrade event has been deployed. Let $F^-=F-F^+$ denote the group of resource units to which the recent upgrade event has not been deployed.

As described above, each resource unit is configured to report and/or send time-series telemetry data S. For instance, this time-series telemetry data S can include various metrics of cardinality m, denoted by:

$$S_n(t): \mathbb{R}^\alpha \to \mathbb{R}^{\alpha \times m}$$

Let $t_u:t_u<t^*$ denote the time a specific resource unit, $F_u$, was upgraded, where $F_u \in F^+$. Let $t_{u1}=[t_a, \ldots, t_c]$ represent the sequence of points in time where S is sampled (e.g., does not need to be linearly spaced), where $t_c$ is an instance of time after the deployment of the recent upgrade event (e.g., the current time) and $t_u$ is associated with the time the recent upgrade event was deployed. Similarly, let $t_{u2}=[t_b, \ldots, t_u]$ represent the sequence of points in time where S is sampled before the recent upgrade event is deployed to the specific resource unit. In one example, $t_b+t_c \approx 2t_u$ (e.g., the time period before and after are the same or approximately the same).

The scoring model 126 uses a scoring comparator function $f(X_1, X_2)$ which maps two matrices $X_1, X_2$ of telemetry signals to a score. In one example, the score reflects a difference in health of $X_1, X_2$ and/or the score can be normalized (e.g., mapped to a value between −1 and 1).

Considering the resource unit $F_u \in F^+$ and its corresponding time $t_u$, when the recent upgrade event was deployed. The scoring model 126 computes metrics $A_u$, B as follows:

$$A_u = f(S_u(t_{u1}), S_u(t_{u2})), \forall u: F_u \in F^+$$

$$B = \max(f(S_j(t_{u1}), S_j(t_{u2}))), \forall j: F_j \in F^-$$

A set of Boolean values can be computed as $$C_u := \frac{A_u}{B} > h$$

Here, h is a free-choice threshold parameter optimized using real data. In one example, there are three possible cases to determine the root cause of a problem, as follows:

| Case | Conclusion |
|---|---|
| All $C_u$ = True | Problem is due to upgrade event. |
| Some $C_u$ = True | Problem may be related to upgrade event or may be environmental. Further investigation required. |
| All $C_u$ = False | Problem is not related to upgrade event. |

Figure 2C:
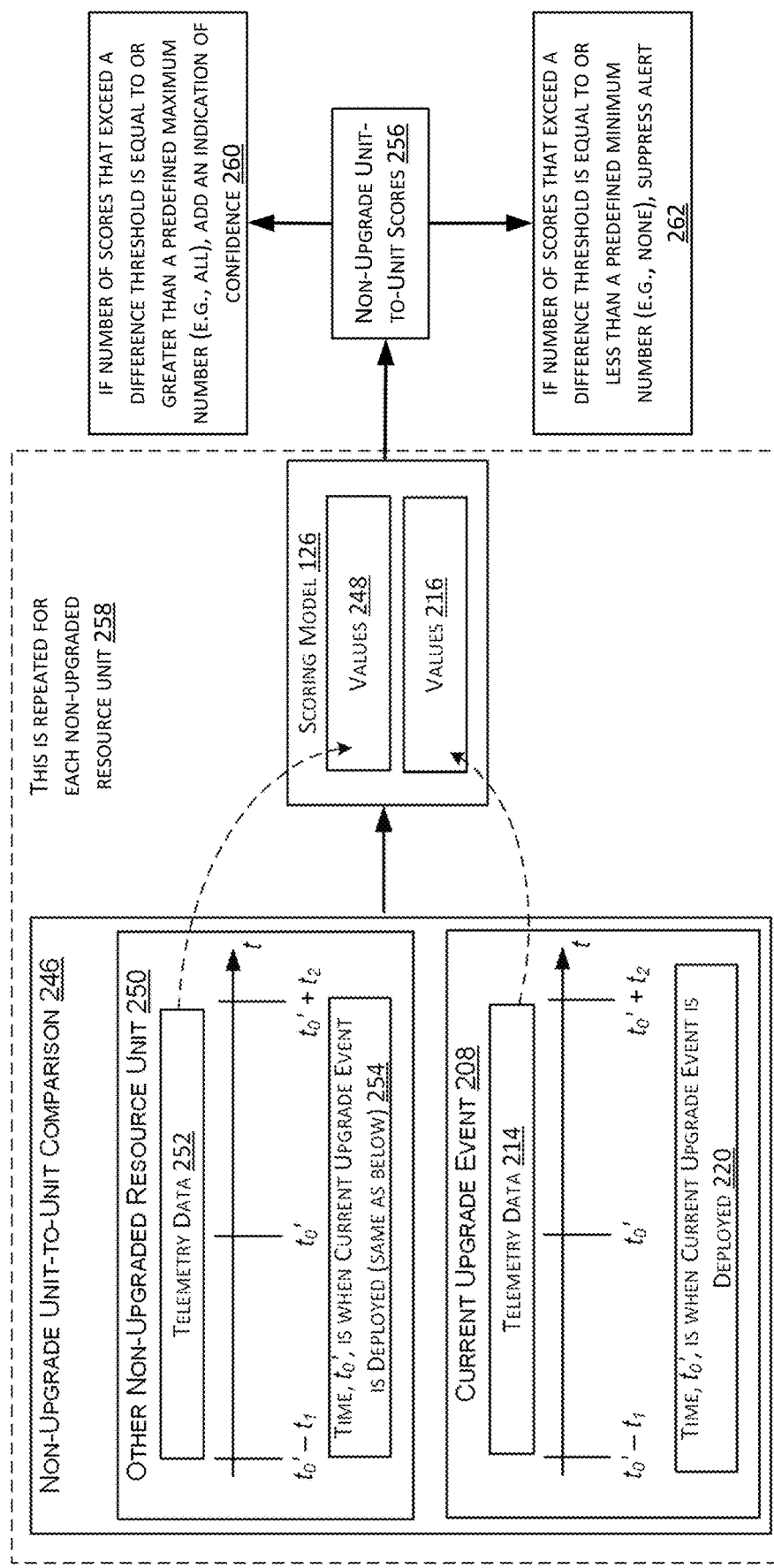
FIG. 2C is a block diagram illustrating how a non-upgrade unit-to-unit score is computed by comparing telemetry data received for a resource unit that has received a current upgrade event and a resource unit that has not received the current upgrade event.

FIG. 2C is a block diagram 244 illustrating how a non-upgrade unit-to-unit score is computed by implementing an non-upgrade unit-to-unit comparison 246 of telemetry data received for a resource unit that has received the current upgrade event and a resource unit that has not received the current upgrade event. The scoring module 122 identifies another group of other resource units in the cloud-based platform to which the current upgrade event has not been deployed. In the example of FIG. 1, resource unit 106(3) is in this group of other resource units to which the current upgrade event 116 has not been deployed.

As described above, the non-upgrade unit-to-unit score is indicative of, or represents, a difference between the set of values 216 associated with the current upgrade event 208 that was deployed to the individual resource unit 106(2) for which the anomaly is detected (similarly illustrated in FIGS. 2A and 2B) and a new set of values 248 associated with another resource unit 250 in the group that has not been upgraded. To this end, FIG. 2C illustrates that telemetry data 252 is collected during the same time period when the current upgrade event was deployed to the resource unit 106(2), as referenced by 254, and telemetry data 252 includes sampled values 248 provided to the scoring model 126.

Accordingly, both sets of values 248 and 216 include telemetry data received during a time period (e.g., thirty minutes, one hour, five hours, twelve hours, etc.) before the current upgrade event is deployed to the resource unit 106(2) and for a time period (e.g., thirty minutes, one hour, five hours, twelve hours, etc.) after the current upgrade event is deployed to the resource unit 106(2). Consequently, the scoring module 122 is configured to use the telemetry data to compare the effects of the current upgrade event to different resource units—one that has received the upgrade event and one that has not received the upgrade event.

The scoring model 126 uses the values 248 and 216 to compute the non-upgrade unit-to-unit score 256 based on the non-upgrade unit-to-unit comparison 246 conducted for resource units 106(3) and 106(2). As reference by 258, a non-upgrade unit-to-unit comparison 246 is repeated for each other resource unit that is included in the identified group of resource units that have not yet been upgraded.

As described above, the scoring model 126 may compute the non-upgrade unit-to-unit score 256 for resource units 106(3) and 106(2) using telemetry data for certain health signaling metrics (e.g., number of unexpected errors, QoS values, etc.) when a total number of user requests indicates normal usage of the service with respect the resource units 106(3) and 106(2). Normal usage can be determined based on historical data associated with a resource unit.

Since a non-upgrade unit-to-unit score 256 is computed for each of the non-upgraded resource units, the scoring model 126 computes multiple non-upgrade unit-to-unit scores 256. Next, the scoring module 122 determines whether each of the multiple non-upgrade unit-to-unit scores 256 exceeds a difference threshold established for the non-upgrade unit-to-unit comparison 256 (e.g., five percent difference, ten percent difference). The difference threshold can be established to accommodate expected variations in telemetry data between a resource unit that has received an upgrade event and a resource unit that has not received the upgrade event.

The scoring module 122 determines or tracks the number of non-upgrade unit-to-unit scores 256 that exceed the difference threshold. In various examples, responsive to determining that the number of the non-upgrade unit-to-unit scores 256 that exceed the difference threshold is greater than or equal to a predefined maximum number (e.g., all the identified non-upgraded resource units), the scoring module 122 is able to add an indication of confidence to the alert signaling that the current upgrade event is the cause of the problem, as referenced by 260. This happens because significant changes have been detected between the telemetry data for the upgraded resource unit associated with the anomaly and non-upgraded resource units.

In various examples, responsive to determining that the number of non-upgrade unit-to-unit scores 256 that exceed the difference threshold is less than or equal to a predefined minimum number (e.g., none), the scoring module 122 may suppress the alert signaling that the current upgrade event is the cause of the problem, as referenced by 262. This happens because now there may be mixed signals as to the source or cause of the problem.

FIG. 3A is an example graphical user interface 300 illustrating how an alert indicating that the current upgrade event is likely the cause of a problem can be displayed to an analyst. As shown, the alert can indicate that there is likely defective code in association with an identifier for the recent upgrade event (e.g., "Upgrade 123") and the time when this determination was made (e.g., February 20 @ 4:30 PM). Moreover, the alert can indicate the outcome of the comparisons discussed above, e.g., that the health/performance of Units 1 through 10 has been affected by upgrade 123 and that Units 1 through 10 are all the units in the cloud-based platform that have been upgraded. A further indication of confidence that the upgrade includes defective code is provided by indicating that Units 11 through 45 are not affected and that these units make up all the non-upgraded units in the cloud-based platform. Finally, the graphical user interface 300 can provide a selectable element 302 that enables an analyst to take further action based on the alert, e.g., stop deployment of the upgrade event.

FIG. 3B is an example graphical user interface 304 illustrating how an alert indicating that the current upgrade event is likely not the cause of a problem can be displayed to an analyst. As shown, the alert can indicate based on the comparison above that an anomaly in a monitored metric has been detected for Unit 8 and that other upgraded Units 1-7, 9, and 10 are not affected by the upgrade. This indicates that the cause of the problem in not the recent upgrade event (e.g., "Upgrade 123"), but rather, an environmental factor localized to Unit 8. Moreover, the graphical user interface 304 can provide a selectable element 306 that enables an analyst to take further action based on the alert, e.g., further look into metrics for Unit 8 so that a problem can be further investigated and/or identified.

Figure 5:
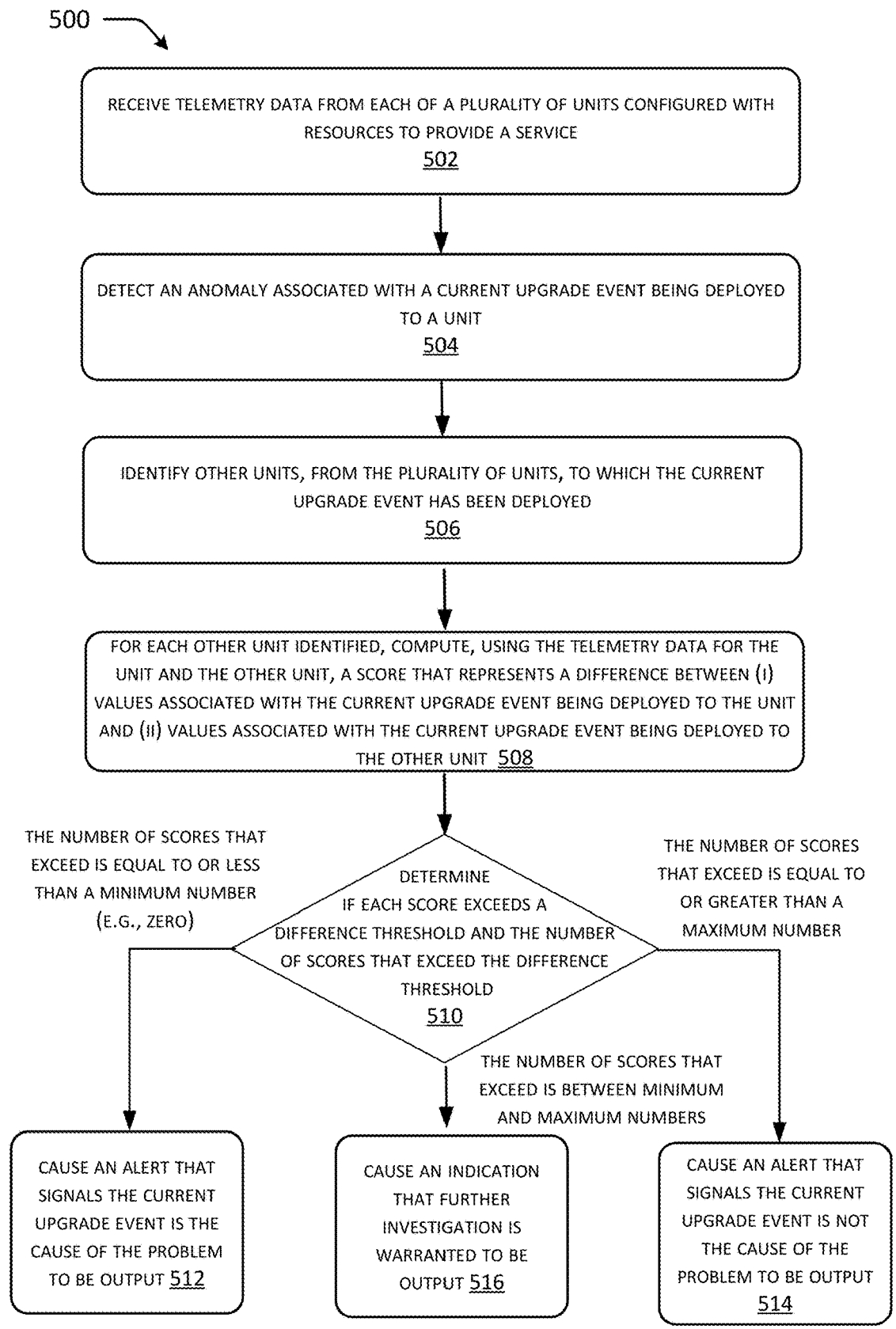
FIG. 5 is a flow diagram of an example method for determining an upgrade unit-to-unit score for various pairs of resource units and further processing the upgrade unit-to-unit scores to determine if a current upgrade event is the cause of a problem.
Figure 6:
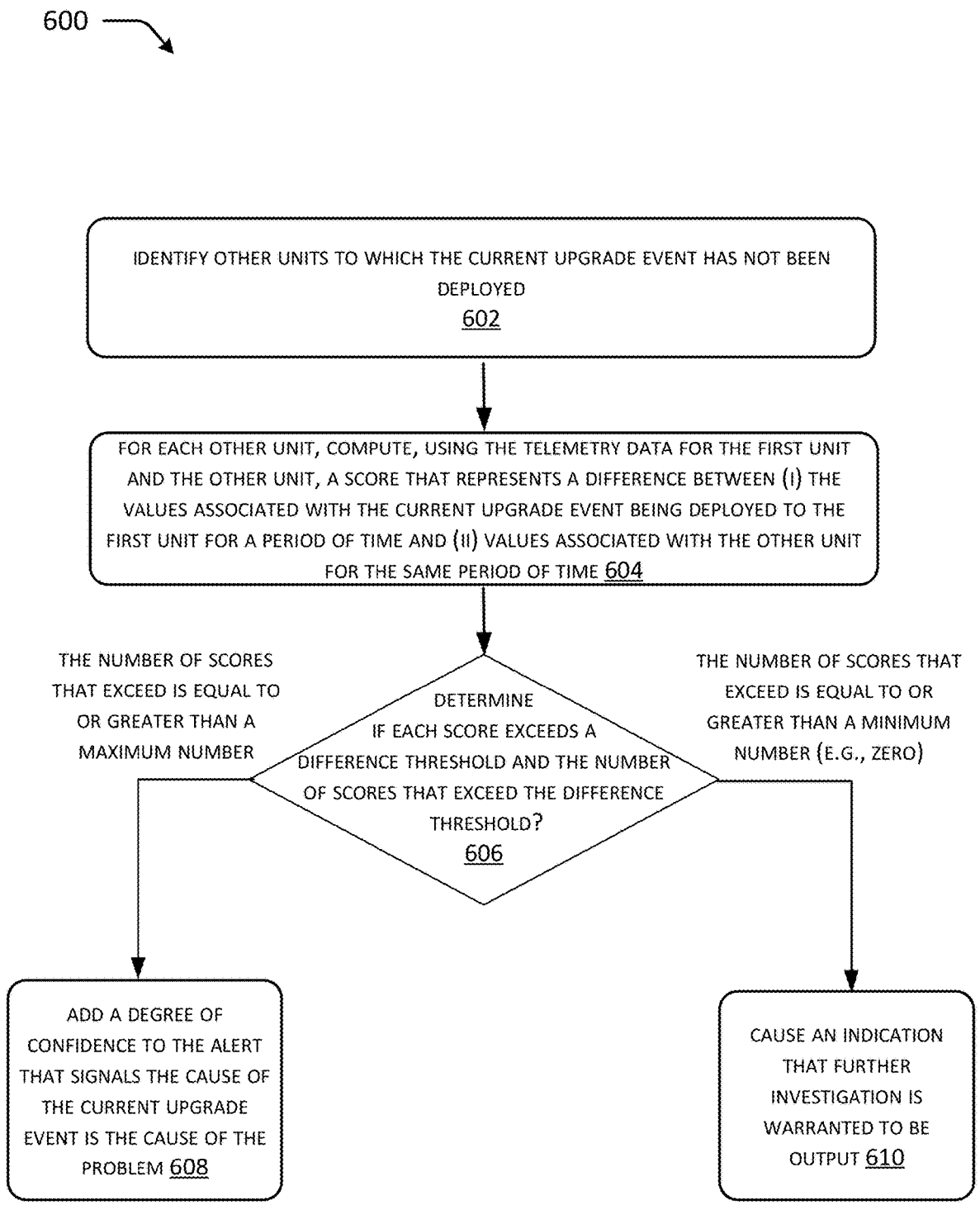
FIG. 6 is a flow diagram of an example method for determining a non-upgrade unit-to-unit score for various pairs of resource units and further processing the non-upgrade unit-to-unit scores to verify that a current upgrade event is the cause of a problem.

FIGS. 4-6 are flow diagrams illustrating routines describing aspects of the present disclosure. The logical operations described herein with regards to any one of FIGS. 4-6 can be implemented (1) as a sequence of computer implemented acts or program modules running on a device and/or (2) as interconnected machine logic circuits or circuit modules within a device.

For ease of understanding, the processes discussed in this disclosure are delineated as separate operations represented as independent blocks. However, these separately delineated operations should not be construed as necessarily order dependent in their performance. The order in which the process is described is not intended to be construed as a limitation, and any number of the described process blocks may be combined in any order to implement the process or an alternate process. Moreover, it is also possible that one or more of the provided operations is modified or omitted.

The particular implementation of the technologies disclosed herein is a matter of choice dependent on the performance and other requirements of a computing device. Accordingly, the logical operations described herein are referred to variously as states, operations, structural devices, acts, or modules. These states, operations, structural devices, acts, and modules can be implemented in hardware, software, firmware, in special-purpose digital logic, and any combination thereof. It should be appreciated that more or fewer operations can be performed than shown in the figures and described herein. These operations can also be performed in a different order than those described herein.

It also should be understood that the illustrated methods can end at any time and need not be performed in their entireties. Some or all operations of the methods, and/or substantially equivalent operations, can be performed by execution of computer-readable instructions included on a computer-readable media. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including processing units in single-processor or multiprocessor systems, minicomputers, mainframe computers, personal computers, head-mounted display devices, hand-held computing devices, microprocessor-based, programmable consumer electronics, combinations thereof, and the like.

For example, the operations can be implemented by dynamically linked libraries ("DLLs"), statically linked libraries, functionality produced by an application programming interface ("API"), a compiled program, an interpreted program, a script, a network service or site, or any other executable set of instructions. Data can be stored in a data structure in one or more memory components. Data can be retrieved from the data structure by addressing links or references to the data structure.

FIG. 4 is a flow diagram of an example method 400 for determining an upgrade-to-upgrade score for an individual resource unit and determining whether the upgrade-to-upgrade score signals that a current upgrade event is the cause of a problem.

At operation 402, telemetry data is received from each of a plurality of units configured with resources to provide a service.

At operation 404, an anomaly associated with deployment of a current upgrade event to a unit is detected.

At operation 406, the telemetry data is used to compute a score for the unit. As described above, the score is an upgrade-to-upgrade score that represents a difference between (i) values associated with a previous upgrade event deployed to the unit and (ii) values associated with a current upgrade event deployed to the unit.

At decision operation 408, it is determined whether the score exceeds a difference threshold. If the score does not exceed the difference threshold, then the method proceeds to operation 410 where an alert that signals a problem is suppressed.

If the score does exceed the difference threshold, then the method proceeds to operation 412 where it is determined that further comparisons should be implemented to determine if a problem is being caused by the current upgrade event (e.g., proceed to FIG. 5).

FIG. 5 is a flow diagram of an example method 500 for determining an upgrade unit-to-unit score for various pairs of resource units and further processing the upgrade unit-to-unit scores to determine if a current upgrade event is the cause of a problem.

At operation 502 (similar to operation 402), telemetry data is received from each of a plurality of units configured with resources to provide a service.

At operation 504 (similar to operation 404), an anomaly associated with deployment of a current upgrade event to a unit is detected.

At operation 506, a group of other units, of the plurality of units, to which the current upgrade event has been deployed, is identified.

At operation 508, the telemetry data is used to compute a score for each other unit identified. As described above, the score is an upgrade unit-to-unit score that represents a difference between (i) values associated with a current upgrade event deployed to the unit and (ii) values associated with the current upgrade event being deployed to the other unit.

At decision operation 510, it is determined whether each of the scores computed in operation 508 exceeds a difference threshold. Moreover, the number of scores that exceed the difference threshold is determined.

If the number of scores that exceed the difference threshold is equal to or less than a predefined minimum number (e.g., zero), then the method proceeds to operation 512 where an alert that signals the current upgrade event is the cause of a problem is output.

If the number of scores that exceed the difference threshold is equal to or greater than a predefined maximum number (e.g., the number, or all, of the units identified in the group), then the method proceeds to operation 514 where an alert that signals the current upgrade event is not the cause of a problem is output.

If the number of scores that exceed the difference threshold is between the predefined minimum number and the predefined maximum number, then the method proceeds to operation 516, where an indication that further investigation is warranted is output.

FIG. 6 is a flow diagram of an example method 600 for determining a non-upgrade unit-to-unit score for various pairs of resource units and further processing the non-upgrade unit-to-unit scores to verify that a current upgrade event is the cause of a problem.

At operation 602, a group of other units to which the current upgrade event has not been deployed is identified.

At operation 604, the telemetry data is used to compute a score for each other unit identified. As described above, the score is a non-upgrade unit-to-unit score that represents a difference between (i) values associated with a current upgrade event deployed to the unit (for which the anomaly was initially detected) during a period of time and (ii) values associated with the other unit during the same period of time.

At decision operation 606, it is determined whether each of the scores computed in operation 604 exceeds a difference threshold. Moreover, the number of scores that exceed the difference threshold is determined.

If the number of scores that exceed the difference threshold is equal to or greater than a predefined maximum number (e.g., the number, or all, of the units identified in the group), then the method proceeds to operation 608 where an indication of confidence is added to an alert that signals the current upgrade event is the cause of a problem.

If the number of scores that exceed the difference threshold is equal to or less than a predefined minimum number (e.g., zero), then the method proceeds to operation 610 where an indication that further investigation is warranted is output.

Figure 7:
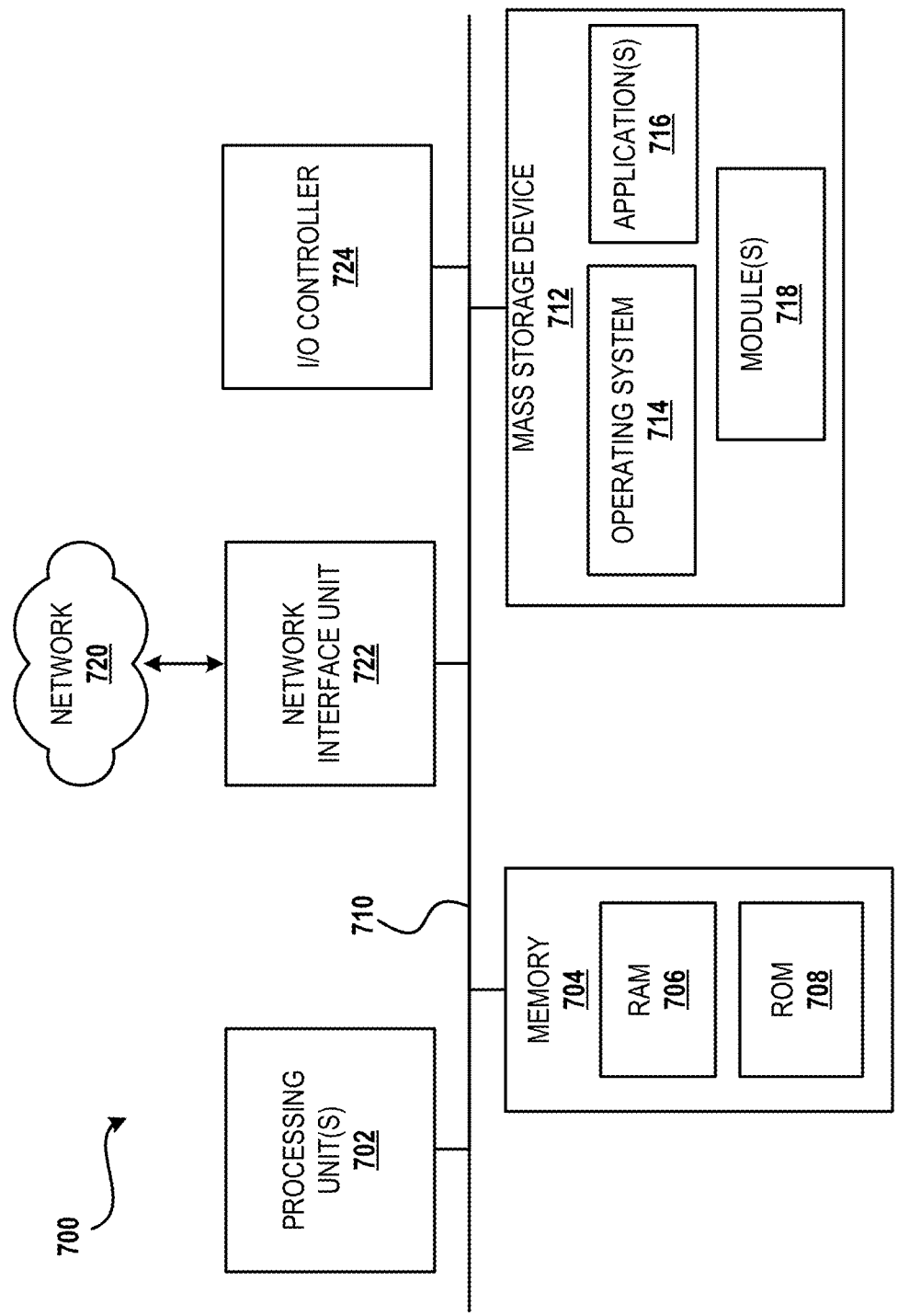
FIG. 7 is a computer architecture diagram illustrating an illustrative computer hardware and software architecture for a computing system capable of implementing aspects of the techniques and technologies presented herein.

FIG. 7 shows additional details of an example computer architecture 700 for a device, such as a computer or a server configured as part of the system 102, capable of executing computer instructions (e.g., a module or a program component described herein). The computer architecture 700 illustrated in FIG. 7 includes processing unit(s) 702, a system memory 704, including a random access memory 706 ("RAM") and a read-only memory ("ROM") 708, and a system bus 710 that couples the memory 704 to the processing unit(s) 702.

Processing unit(s), such as processing unit(s) 702, can represent, for example, a CPU-type processing unit, a GPU-type processing unit, a field-programmable gate array (FPGA), another class of digital signal processor (DSP), or other hardware logic components that may, in some instances, be driven by a CPU. For example, and without limitation, illustrative types of hardware logic components that can be used include Application-Specific Integrated Circuits (ASICs), Application-Specific Standard Products (ASSPs), System-on-a-Chip Systems (SOCs), Complex Programmable Logic Devices (CPLDs), etc.

A basic input/output system containing the basic routines that help to transfer information between elements within the computer architecture 700, such as during startup, is stored in the ROM 708. The computer architecture 700 further includes a mass storage device 712 for storing an operating system 714, application(s) 716, modules 718 (e.g., the upgrade module 112, the scoring module 122, and the output module 124), and other data described herein.

The mass storage device 712 is connected to processing unit(s) 702 through a mass storage controller connected to the bus 710. The mass storage device 712 and its associated computer-readable media provide non-volatile storage for the computer architecture 700. Although the description of computer-readable media contained herein refers to a mass storage device, it should be appreciated by those skilled in the art that computer-readable media can be any available computer-readable storage media or communication media that can be accessed by the computer architecture 700.

Computer-readable media can include computer storage media and/or communication media. Computer storage media can include one or more of volatile memory, non-volatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including but not limited to random access memory (RAM), static random-access memory (SRAM), dynamic random-access memory (DRAM), phase change memory (PCM), read-only memory (ROM), erasable programmable read-only memory (EPROM), electrically erasable programmable read-only memory (EEPROM), flash memory, compact disc read-only memory (CD-ROM), digital versatile disks (DVDs), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast to computer storage media, communication media can embody computer-readable instructions, data structures, program modules, or other data in a modulated data signal, such as a carrier wave, or other transmission mechanism. As defined herein, computer storage media does not include communication media. That is, computer storage media does not include communications media consisting solely of a modulated data signal, a carrier wave, or a propagated signal, per se.

According to various configurations, the computer architecture 500 may operate in a networked environment using logical connections to remote computers through the network 520. The computer architecture 700 may connect to the network 720 through a network interface unit 722 connected to the bus 710. The computer architecture 700 also may include an input/output controller 724 for receiving and processing input from a number of other devices, including a keyboard, mouse, touch, or electronic stylus or pen. Similarly, the input/output controller 724 may provide output to a display screen, a printer, or other type of output device.

It should be appreciated that the software components described herein may, when loaded into the processing unit(s) 702 and executed, transform the processing unit(s) 702 and the overall computer architecture 700 from a general-purpose computing system into a special-purpose computing system customized to facilitate the functionality presented herein. The processing unit(s) 702 may be constructed from any number of transistors or other discrete circuit elements, which may individually or collectively assume any number of states. More specifically, the processing unit(s) 702 may operate as a finite-state machine, in response to executable instructions contained within the software modules disclosed herein. These computer-executable instructions may transform the processing unit(s) 702 by specifying how the processing unit(s) 702 transition between states, thereby transforming the transistors or other discrete hardware elements constituting the processing unit(s) 702.

Figure 8:
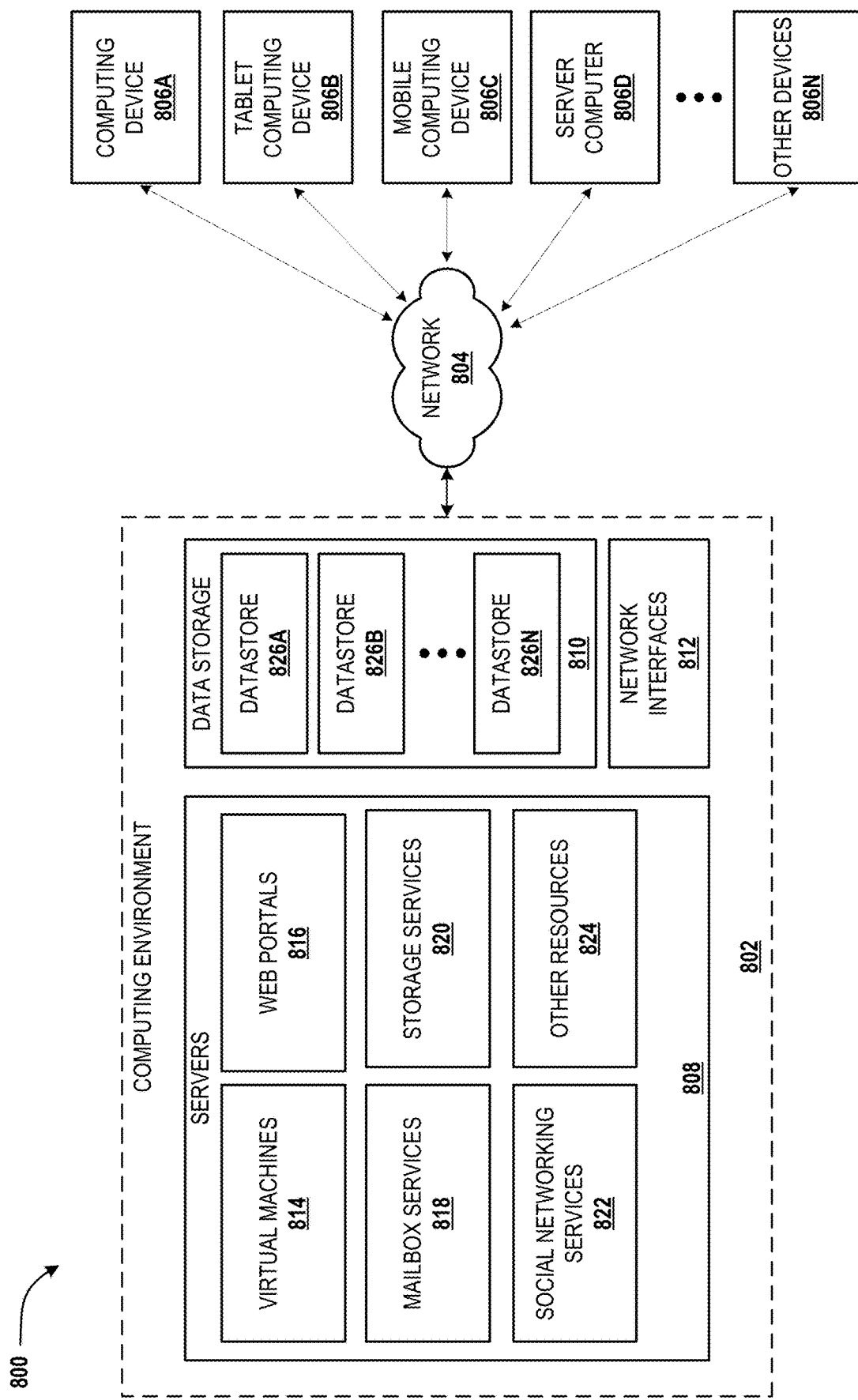
FIG. 8 is a diagram illustrating a distributed computing environment capable of implementing aspects of the techniques and technologies presented herein.

FIG. 8 depicts an illustrative distributed computing environment 800 within which the techniques described herein can be implemented. For example, the distributed computing environment 800 can includes resources that can provide a service to user devices. Moreover, the health of the resources can be monitored by a health center (e.g., the system 102 in FIG. 1).

Accordingly, the distributed computing environment 800 can include a computing environment 802 operating on, in communication with, or as part of the network 804. The network 804 can include various access networks. One or more client devices 806A-806N (hereinafter referred to collectively and/or generically as "clients 806" and also referred to herein as computing devices 806) can communicate with the computing environment 802 via the network 804. In one illustrated configuration, the clients 806 include a computing device 806A such as a laptop computer, a desktop computer, or other computing device; a slate or tablet computing device ("tablet computing device") 806B; a mobile computing device 806C such as a mobile telephone, a smart phone, or other mobile computing device; a server computer 806D; and/or other devices 806N. It should be understood that any number of clients 806 can communicate with the computing environment 802.

In various examples, the computing environment 802 includes servers 808, data storage 810, and one or more network interfaces 812. The servers 808 can host various services, virtual machines, portals, and/or other resources. In the illustrated configuration, the servers 808 host virtual machines 814, Web portals 816, mailbox services 818, storage services 820, and/or, social networking services 822. As shown in FIG. 8 the servers 808 also can host other services, applications, portals, and/or other resources ("other resources") 824.

As mentioned above, the computing environment 802 can include the data storage 810. According to various implementations, the functionality of the data storage 810 is provided by one or more databases operating on, or in communication with, the network 804. The functionality of the data storage 810 also can be provided by one or more servers configured to host data for the computing environment 802. The data storage 810 can include, host, or provide one or more real or virtual datastores 826A-826N (hereinafter referred to collectively and/or generically as "datastores 826"). The datastores 826 are configured to host data used or created by the servers 808 and/or other data. That is, the datastores 826 also can host or store web page documents, word documents, presentation documents, data structures, algorithms for execution by a recommendation engine, and/or other data utilized by any application program. Aspects of the datastores 826 may be associated with a service for storing files.

The computing environment 802 can communicate with, or be accessed by, the network interfaces 812. The network interfaces 812 can include various types of network hardware and software for supporting communications between two or more computing devices including, but not limited to, the computing devices and the servers. It should be appreciated that the network interfaces 812 also may be utilized to connect to other types of networks and/or computer systems.

It should be understood that the distributed computing environment 800 described herein can provide any aspects of the software elements described herein with any number of virtual computing resources and/or other distributed computing functionality that can be configured to execute any aspects of the software components disclosed herein. According to various implementations of the concepts and technologies disclosed herein, the distributed computing environment 800 provides the software functionality described herein as a service to the computing devices. It should be understood that the computing devices can include real or virtual machines including, but not limited to, server computers, web servers, personal computers, mobile computing devices, smart phones, and/or other devices. As such, various configurations of the concepts and technologies disclosed herein enable any device configured to access the distributed computing environment 800 to utilize the functionality described herein for providing the techniques disclosed herein, among other aspects.

The disclosure presented herein also encompasses the subject matter set forth in the following clauses.

Example Clause A, a system comprising: one or more processing units; and computer-readable storage media storing instructions, that when executed by the one or more processing units, configure the system to perform operations comprising: receiving telemetry data from each of a plurality of units configured with resources to provide a service; computing, using the telemetry data for a first unit of the plurality of units, a first score using a scoring model, wherein the first score is indicative of a difference between (i) first values associated with a previous upgrade event being deployed to the first unit and (ii) second values associated with a current upgrade event being deployed to the first unit; determining whether the first score exceeds a first difference threshold; responsive to determining that the first score does not exceed the first difference threshold, suppressing an alert signaling that the current upgrade event is a cause of a problem; responsive to determining that the first score does exceed the first difference threshold: identifying a group of other units, from the plurality of units and other than the first unit, to which the current upgrade event has been deployed; for each other unit in the group of other units, computing, using the telemetry data for the first unit and the other unit, a second score using the scoring model, wherein the second score is indicative of a difference between (i) the second values associated with the current upgrade event being deployed to the first unit and (ii) third values associated with the current upgrade event being deployed to the other unit; determining a number of the second scores, computed for each of the other units in the group, that exceed a second difference threshold; responsive to determining that the number of the second scores that exceed the second difference threshold is less than or equal to a predefined minimum number, causing the alert signaling that the current upgrade event is the cause of the problem to be output; and responsive to determining that the number of the second scores that exceed the second difference threshold is greater than or equal to a predefined maximum number, causing another alert signaling that the first unit is the cause of the problem to be output.

Example Clause B, the system of Example Clause A, wherein the operations further comprise causing an indication that further investigation is warranted to be output responsive to determining that the number of the second scores that exceed the second difference threshold is between the predefined minimum number and the predefined maximum number.

Example Clause C, the system of Example Clause A or Example Clause B, wherein the telemetry data comprises a number of unexpected errors.

Example Clause D, the system of Example Clause C, wherein the telemetry data comprises a total number of requests, and each of the first score and the second score are computed using the number of expected errors when the total number of requests indicates normal usage of the service.

Example Clause E, the system of Example Clause A or Example Clause B, wherein the telemetry data comprises a quality of service (QoS) value.

Example Clause F, the system of Example Clause E, wherein the telemetry data comprises a total number of requests, and each of the first score and the second score are computed using the QoS value when the total number of requests indicates normal usage of the service.

Example Clause G, the system of any one of Example Clauses A through F, wherein computing the first score is implemented in response to detecting an anomaly associated with the current upgrade event being deployed to the first unit.

Example Clause H, the system of any one of Example Clauses A through G, wherein: the group of other units comprises a first group of other units; the system determines that the number of the second scores that exceed the second difference threshold is less than or equal to the predefined minimum number; and the operations further comprise: identifying a second group of other units, from the plurality of units and other than the first unit, to which the current upgrade event has not been deployed; for each other unit in the second group of other units, computing, using the telemetry data for the first unit and the other unit, a third score using the scoring model, wherein the third score is indicative of a difference between (i) the second values associated with the current upgrade event being deployed to the first unit for a period of time and (ii) fourth values associated with the other unit for the same period of time; determining a number of the third scores, computed for each of the other units in the second group, that exceed a third difference threshold; responsive to determining that the number of the third scores that exceed the third difference threshold is greater than or equal to the predefined maximum number, adding an indication of confidence to the alert signaling that the current upgrade event is the cause of the problem; and responsive to determining that the number of the third scores that exceed the third difference threshold is less than or equal to the predefined minimum number, suppressing the alert signaling that the current upgrade event is the cause of the problem.

Example Clause I, the system of any one of Example Clauses A through H, wherein the scoring model comprises a comparator function configured to map two matrices to a normalized value.

Example Clause J, the system of Example Clause I, wherein the comparator function comprises a Siamese Neural Network or a Multivariate Gaussian Distribution.

Example Clause K, a method comprising: computing, by one or more processors, a score that represents a difference between (i) first telemetry values associated with a current upgrade event being deployed to a first unit and (ii) second telemetry values associated with the current upgrade event being deployed to each of a group of other upgraded units; determining a number of the scores that exceed a difference threshold; and causing an alert to be output, the alert signaling whether the current upgrade event is a cause of a problem based at least in part on the number of scores that exceed the difference threshold.

Example Clause L, the method of Example Clause K, further comprising causing the alert to signal that the current upgrade event is the cause of the problem responsive to determining that the number of the scores that exceed the difference threshold is less than or equal to a predefined minimum number.

Example Clause M, the method of Example Clause K, further comprising causing the alert to signal that the current upgrade event is not the cause of the problem responsive to determining that the number of the scores that exceed the difference threshold is greater than or equal to a predefined maximum number.

Example Clause N, the method of Example Clause K, further comprising causing the alert to signal that further investigation is warranted responsive to determining that the number of the scores that exceed the difference threshold is between a predefined minimum number and a predefined maximum number.

Example Clause O, the method of any one of Example Clauses K through N, wherein the first telemetry values and the second telemetry values comprise at least one of a number of unexpected errors or a quality of service (QoS) value.

Example Clause P, the method of Example Clause O, wherein the first telemetry values and the second telemetry values comprise a total number of requests, and the score is computed using the at least one of the number of unexpected errors or the quality of service (QoS) value when the total number of requests indicates normal usage of a service provided by the first unit and the group of other units.

Example Clause Q, the method of Example Clause K, further comprising: determining that the number of the scores that exceed the difference threshold is less than or equal to a predefined minimum number; computing another score that represents a difference between (i) the first telemetry values associated with the current upgrade event being deployed to the first unit during a period of time and (ii) third telemetry values associated with each other non-upgraded unit, in a group of non-upgraded units, during the same period of time; determining a number of the other scores that exceed another difference threshold; and adding an indication of confidence to the alert based on the number of the other scores that exceed the other difference threshold.

Example Clause R, a system comprising: one or more processing units; and computer-readable storage media storing instructions, that when executed by the one or more processing units, configure the system to perform operations comprising: computing a score that represents a difference between (i) first telemetry values associated with a current upgrade event being deployed to a first unit and (ii) second telemetry values associated with the current upgrade event being deployed to each of a group of other upgraded units; determining a number of the scores that exceed a difference threshold; responsive to determining that the number of the scores that exceed the difference threshold is less than or equal to a predefined minimum number, causing an alert to signal that the current upgrade event is a cause of a problem to be output via a computing device; and responsive to determining that the number of the scores that exceed the difference threshold is greater than or equal to a predefined maximum number, causing an alert to signal that the current upgrade event is not the cause of the problem to be output via the computing device.

Example Clause S, the system of Example Clause R, wherein the operations further comprise causing an indication that further investigation is warranted to be output responsive to determining that the number of the scores that exceed the difference threshold is between the predefined minimum number and the predefined maximum number.

Example Clause T, the system of Example Clause R or Example Clause S, wherein the first telemetry values and the second telemetry values comprise a quality of service (QoS) value and a total number of requests, and the score is computed using the quality of service (QoS) value when the total number of requests indicates normal usage of a service provided by the first unit and the group of other upgraded units.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

Conditional language such as, among others, "can," "could," "might" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example. Conjunctive language such as the phrase "at least one of X, Y or Z," unless specifically stated otherwise, is to be understood to present that an item, term, etc. may be either X, Y, or Z, or a combination thereof.

The terms "a," "an," "the" and similar referents used in the context of describing the invention (especially in the context of the following claims) are to be construed to cover both the singular and the plural unless otherwise indicated herein or clearly contradicted by context. The terms "based on," "based upon," and similar referents are to be construed as meaning "based at least in part" which includes being "based in part" and "based in whole" unless otherwise indicated or clearly contradicted by context.

It should be appreciated that any reference to "first," "second," etc. elements within the Summary and/or Detailed Description is not intended to and should not be construed to necessarily correspond to any reference of "first," "second," etc. elements of the claims. Rather, any use of "first" and "second" within the Summary, Detailed Description, and/or claims may be used to distinguish between two different instances of the same element (e.g., two different resource units, two different users, etc.).

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter. All examples are provided for illustrative purposes and is not to be construed as limiting.

What is claimed is:

1. A system comprising:
one or more processing units; and
computer-readable storage media storing instructions, that when executed by the one or more processing units, configure the system to perform operations comprising:
receiving telemetry data from each of a plurality of units configured with resources to provide a service;
computing, using the telemetry data for a first unit of the plurality of units, a first score using a scoring model, wherein the first score is indicative of a difference between (i) first values associated with a previous upgrade event being deployed to the first unit and (ii) second values associated with a current upgrade event being deployed to the first unit;
determining whether the first score exceeds a first difference threshold;

responsive to determining that the first score does not exceed the first difference threshold, suppressing an alert signaling that the current upgrade event is a cause of a problem;

responsive to determining that the first score does exceed the first difference threshold:
identifying a group of other units, from the plurality of units and other than the first unit, to which the current upgrade event has been deployed;
for each other unit in the group of other units, computing, using the telemetry data for the first unit and the other unit, a second score using the scoring model, wherein the second score is indicative of a difference between (i) the second values associated with the current upgrade event being deployed to the first unit and (ii) third values associated with the current upgrade event being deployed to the other unit;
determining a number of the second scores, computed for each of the other units in the group, that exceed a second difference threshold;
responsive to determining that the number of the second scores that exceed the second difference threshold is less than or equal to a predefined minimum number, causing the alert signaling that the current upgrade event is the cause of the problem to be output; and
responsive to determining that the number of the second scores that exceed the second difference threshold is greater than or equal to a predefined maximum number, causing another alert signaling that the first unit is the cause of the problem to be output.

2. The system of claim 1, wherein the operations further comprise causing an indication that further investigation is warranted to be output responsive to determining that the number of the second scores that exceed the second difference threshold is between the predefined minimum number and the predefined maximum number.

3. The system of claim 1, wherein the telemetry data comprises a number of unexpected errors.

4. The system of claim 3, wherein the telemetry data comprises a total number of requests, and each of the first score and the second score are computed using the number of expected errors when the total number of requests indicates normal usage of the service.

5. The system of claim 1, wherein the telemetry data comprises a quality of service (QoS) value.

6. The system of claim 5, wherein the telemetry data comprises a total number of requests, and each of the first score and the second score are computed using the QoS value when the total number of requests indicates normal usage of the service.

7. The system of claim 1, wherein computing the first score is implemented in response to detecting an anomaly associated with the current upgrade event being deployed to the first unit.

8. The system of claim 1, wherein:
the group of other units comprises a first group of other units;
the system determines that the number of the second scores that exceed the second difference threshold is less than or equal to the predefined minimum number; and
the operations further comprise:
identifying a second group of other units, from the plurality of units and other than the first unit, to which the current upgrade event has not been deployed;
for each other unit in the second group of other units, computing, using the telemetry data for the first unit and the other unit, a third score using the scoring model, wherein the third score is indicative of a difference between (i) the second values associated with the current upgrade event being deployed to the first unit for a period of time and (ii) fourth values associated with the other unit for the same period of time;
determining a number of the third scores, computed for each of the other units in the second group, that exceed a third difference threshold;
responsive to determining that the number of the third scores that exceed the third difference threshold is greater than or equal to the predefined maximum number, adding an indication of confidence to the alert signaling that the current upgrade event is the cause of the problem; and
responsive to determining that the number of the third scores that exceed the third difference threshold is less than or equal to the predefined minimum number, suppressing the alert signaling that the current upgrade event is the cause of the problem.

9. The system of claim 1, wherein the scoring model comprises a comparator function configured to map two matrices to a normalized value.

10. The system of claim 9, wherein the comparator function comprises a Siamese Neural Network or a Multivariate Gaussian Distribution.

11. A method comprising:
receiving telemetry data from each of a plurality of units configured with resources to provide a service;
computing, by one or more processors and using the telemetry data for a first unit of the plurality of units, a first score using a scoring model, wherein the first score is indicative of a difference between (i) first values associated with a previous upgrade event being deployed to the first unit and (ii) second values associated with a current upgrade event being deployed to the first unit;
determining whether the first score exceeds a first difference threshold;
responsive to determining that the first score does not exceed the first difference threshold, suppressing an alert signaling that the current upgrade event is a cause of a problem;
responsive to determining that the first score does exceed the first difference threshold:
identifying a group of other units, from the plurality of units and other than the first unit, to which the current upgrade event has been deployed;
for each other unit in the group of other units, computing, using the telemetry data for the first unit and the other unit, a second score using the scoring model, wherein the second score is indicative of a difference between (i) the second values associated with the current upgrade event being deployed to the first unit and (ii) third values associated with the current upgrade event being deployed to the other unit;
determining a number of the second scores, computed for each of the other units in the group, that exceed a second difference threshold;
responsive to determining that the number of the second scores that exceed the second difference threshold is less than or equal to a predefined minimum number, causing the alert signaling that the current upgrade event is the cause of the problem to be output; and responsive to determining that the number of the second scores that exceed the second difference threshold is greater than or equal to a predefined maximum number, causing another alert signaling that the first unit is the cause of the problem to be output.

12. The method of claim 11, further comprising causing an indication that further investigation is warranted to be output responsive to determining that the number of the second scores that exceed the second difference threshold is between the predefined minimum number and the predefined maximum number.

13. The method of claim 11, wherein the telemetry data comprises a number of unexpected errors and a total number of requests, and each of the first score and the second score are computed using the number of expected errors when the total number of requests indicates normal usage of the service.

14. The method of claim 11, wherein the telemetry data comprises a quality of service (QoS) value and a total number of requests, and each of the first score and the second score are computed using the QoS value when the total number of requests indicates normal usage of the service.

15. The method of claim 11, wherein:
the group of other units comprises a first group of other units;
it is determined that the number of the second scores that exceed the second difference threshold is less than or equal to the predefined minimum number; and
the method further comprises:
identifying a second group of other units, from the plurality of units and other than the first unit, to which the current upgrade event has not been deployed;
for each other unit in the second group of other units, computing, using the telemetry data for the first unit and the other unit, a third score using the scoring model, wherein the third score is indicative of a difference between (i) the second values associated with the current upgrade event being deployed to the first unit for a period of time and (ii) fourth values associated with the other unit for the same period of time;
determining a number of the third scores, computed for each of the other units in the second group, that exceed a third difference threshold;
responsive to determining that the number of the third scores that exceed the third difference threshold is greater than or equal to the predefined maximum number, adding an indication of confidence to the alert signaling that the current upgrade event is the cause of the problem; and
responsive to determining that the number of the third scores that exceed the third difference threshold is less than or equal to the predefined minimum number, suppressing the alert signaling that the current upgrade event is the cause of the problem.

16. The method of claim 11, wherein the scoring model comprises a comparator function configured to map two matrices to a normalized value.

17. One or more computer-readable storage media not including a signal and storing instructions, that when executed by one or more processing units, configure a system to perform operations comprising:
receiving telemetry data from each of a plurality of units configured with resources to provide a service;
computing, using the telemetry data for a first unit of the plurality of units, a first score using a scoring model, wherein the first score is indicative of a difference between (i) first values associated with a previous upgrade event being deployed to the first unit and (ii) second values associated with a current upgrade event being deployed to the first unit;
determining whether the first score exceeds a first difference threshold;
responsive to determining that the first score does not exceed the first difference threshold, suppressing an alert signaling that the current upgrade event is a cause of a problem;
responsive to determining that the first score does exceed the first difference threshold:
identifying a group of other units, from the plurality of units and other than the first unit, to which the current upgrade event has been deployed;
for each other unit in the group of other units, computing, using the telemetry data for the first unit and the other unit, a second score using the scoring model, wherein the second score is indicative of a difference between (i) the second values associated with the current upgrade event being deployed to the first unit and (ii) third values associated with the current upgrade event being deployed to the other unit;
determining a number of the second scores, computed for each of the other units in the group, that exceed a second difference threshold;
responsive to determining that the number of the second scores that exceed the second difference threshold is less than or equal to a predefined minimum number, causing the alert signaling that the current upgrade event is the cause of the problem to be output; and
responsive to determining that the number of the second scores that exceed the second difference threshold is greater than or equal to a predefined maximum number, causing another alert signaling that the first unit is the cause of the problem to be output.

18. The one or more computer-readable storage media of claim 17, wherein the operations further comprise causing an indication that further investigation is warranted to be output responsive to determining that the number of the second scores that exceed the second difference threshold is between the predefined minimum number and the predefined maximum number.

19. The one or more computer-readable storage media of claim 17, wherein the telemetry data comprises a number of unexpected errors and a total number of requests, and each of the first score and the second score are computed using the number of expected errors when the total number of requests indicates normal usage of the service.

20. The one or more computer-readable storage media of claim 17, wherein the telemetry data comprises a quality of service (QoS) value and a total number of requests, and each of the first score and the second score are computed using the QoS value when the total number of requests indicates normal usage of the service.

* * * * *